US010970217B1

(12) United States Patent
Dastidar et al.

(10) Patent No.: US 10,970,217 B1
(45) Date of Patent: Apr. 6, 2021

(54) DOMAIN AWARE DATA MIGRATION IN COHERENT HETEROGENOUS SYSTEMS

(71) Applicant: XILINX, INC., San Jose, CA (US)

(72) Inventors: Jaideep Dastidar, San Jose, CA (US); Millind Mittal, Saratoga, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/422,647

(22) Filed: May 24, 2019

(51) Int. Cl.
| G06F 12/06 | (2006.01) |
| G06F 12/08 | (2016.01) |
| G06F 12/02 | (2006.01) |
| G06F 9/50 | (2006.01) |
| G06F 12/0831 | (2016.01) |
| G06F 13/42 | (2006.01) |
| G06F 9/4401 | (2018.01) |
| G06F 13/40 | (2006.01) |

(52) U.S. Cl.
CPC ........ *G06F 12/0831* (2013.01); *G06F 9/4401* (2013.01); *G06F 9/5016* (2013.01); *G06F 12/0284* (2013.01); *G06F 12/0692* (2013.01); *G06F 13/4022* (2013.01); *G06F 13/4282* (2013.01); *G06F 2212/2542* (2013.01); *G06F 2213/0026* (2013.01)

(58) Field of Classification Search
None
See application file for complete search history.

(56) References Cited

U.S. PATENT DOCUMENTS

| 6,041,049 A * | 3/2000 | Brady | H04L 45/02 370/351 |
| 7,577,813 B2 * | 8/2009 | Nijhawan | G06F 9/5016 711/147 |
| 2002/0087652 A1 * | 7/2002 | Davis | G06F 9/505 709/213 |
| 2005/0240735 A1 * | 10/2005 | Shen | G06F 12/0831 711/144 |
| 2006/0143390 A1 * | 6/2006 | Kottapalli | G06F 12/126 711/130 |
| 2007/0214333 A1 * | 9/2007 | Nijhawan | G06F 13/4243 711/165 |
| 2008/0270454 A1 * | 10/2008 | Davis | G06F 9/505 |

(Continued)

OTHER PUBLICATIONS

U.S. Appl. No. 15/967,473, filed Apr. 30, 2018, Entitled: "Circuit for and Method of Providing a Programmable Connector of an Integrated Circuit Device".

(Continued)

*Primary Examiner* — Kaushikkumar M Patel
(74) *Attorney, Agent, or Firm* — Patterson + Sheridan, LLP

(57) ABSTRACT

Embodiments disclosed herein provide a domain aware data migration scheme between processing elements, memory, and various caches in a CC-NUMA system. The scheme creates domain awareness in data migration operations, such as Direct Cache Transfer (DCT) operation, stashing operation, and in the allocation of policies of snoop filters and private, shared, or inline caches. The scheme defines a hardware-software interface to communicate locality information (also referred herein as affinity information or proximity information) and subsequent hardware behavior for optimal data migration, thus overcoming traditional CC-NUMA limitations.

20 Claims, 13 Drawing Sheets

(56) References Cited

U.S. PATENT DOCUMENTS

| | | | |
|---|---|---|---|
| 2010/0125677 A1* | 5/2010 | Bouvier | G06F 12/126 |
| | | | 710/5 |
| 2014/0032853 A1* | 1/2014 | Lih | G06F 12/0815 |
| | | | 711/141 |
| 2016/0210049 A1* | 7/2016 | van Riel | G06F 11/3037 |
| 2017/0300427 A1* | 10/2017 | Lin | G06F 12/128 |
| 2018/0143905 A1* | 5/2018 | Roberts | G06F 12/0822 |
| 2018/0189180 A1* | 7/2018 | Fahim | G06F 12/0833 |
| 2018/0287964 A1 | 10/2018 | Gray | |

OTHER PUBLICATIONS

U.S. Appl. No. 16/024,500, filed Jun. 29, 2018, Entitled: "Transparent Port Aggregation in Multi-Chip Transport Protocols".

U.S. Appl. No. 16/025,762, filed Jul. 2, 2018, Entitled: "Logical Transport Overlayed Over a Physical Transport Having a Tree Topology".

U.S. Appl. No. 16/053,384, filed Aug. 2, 2018, Entitled: "Logical Transport Over a Fixed PCIE Physical Transport Network".

U.S. Appl. No. 16/141,704, filed Sep. 25, 2018, Entitled: "Scalable Coherence Management Independent of Transport Protocol".

U.S. Appl. No. 16/053,488, filed Aug. 2, 2018, Entitled: "Hybrid Precise and Imprecise Cache Snoop Filtering".

U.S. Appl. No. 16/208,260, filed Dec. 3, 2018, Entitled: "Scratchpad Memory Management in a Computing System".

* cited by examiner

DOMAIN AWARE DATA MIGRATION IN COHERENT HETEROGENOUS SYSTEMS

TECHNICAL FIELD

Examples of the present disclosure generally relate to cache coherent multi-processor systems and, in particular, to data migration in such systems.

BACKGROUND

Multi-socket server systems and cache-coherent CPU-Accelerator systems, such as those enabled by Cache Coherent Interconnect for Accelerators (CCIX), QuickPath Interconnect (QPI)/Ultra Path Interconnect (UPI), Infinity Fabric, NVLink, and Open Coherent Accelerator Processor Interface (CAPI) are all inherently Cache-Coherent Non-Uniform Memory Access (CC-NUMA) systems. CC-NUMA comes about as a result of the difference in both latency and bandwidth depending on whether the request agent (CPU or generic initiator) accesses local or remote memory (main memory or specific purpose memory) and where that memory may be cached at the time of access. System performance has improved such that the increase in scale of both compute and memory achieved by the CC-NUMA system has offset the detrimental effects of non-uniform memory access.

Another innovation in modern heterogeneous systems involves providing software with affinity information between compute elements (e.g., CPU, generic initiator) and memory elements (e.g., host-attached memory or accelerator-attached specific-purpose memory) that forms a system in order to offset the detrimental effects of CC-NUMA. The affinity information can be propagated upstream, i.e., from the firmware layer, to the OS-boot layer, on to the Application layer using data structures, such as those defined for firmware industry standards such as Unified Extension Firmware Interface (UEFI) and Advanced Configuration and Power Interface (ACPI).

Software, while running virtual machines (VMs) or containers for example, can use this affinity information to affine processes to a producer-consumer compute pair—such as a generic initiator paired with a CPU, and also affine the memory—such as allocating specific purpose memory for that producer-consumer. These affinity algorithms use the affinity information, made available to software, to reduce the non-uniformity of accesses while datasets are being produced and consumed, and thus improve the efficiency of the CC-NUMA system.

SUMMARY

These and other aspects may be understood with reference to the following detailed description. One embodiment herein is a method for domain-aware data migration in a cache-coherent system comprising a plurality of nodes, each node including at least one of a processing element and a memory element. The method includes determining a multi-dimensional topology of the cache-coherent system, and generating, at boot-time, at least one of an ID map (IDM) table and a system address map (SAM) table based on the plurality of nodes and the multi-dimensional topology where the IDM table comprises locality information of each node relative to the other nodes in the plurality of nodes based on a processing or memory element ID and where the SAM table comprises the locality information based on memory address ranges. The method also includes distributing the at least one of IDM table and the SAM table to the processing and memory elements of each of the plurality of nodes and performing data migration operations at a node of the plurality of nodes using the locality information contained in the at least one of IDM table and the SAM table.

Another embodiment described herein is a cache-coherent system that includes a plurality of nodes arranged in a multi-dimensional topology, each of the plurality of nodes comprising at least one of a processing element and a memory element and a plurality of switches interconnecting the plurality of nodes. Further, at least one of an IDM table and a SAM table is stored in each of the plurality of nodes and the plurality of switches where the IDM table comprises locality information of each node relative to the other nodes in the plurality of nodes based on a processing or memory element ID, and where the SAM table comprises the locality information based on memory address ranges. The plurality of nodes are configured to perform data migration operations at a node of the plurality of nodes using the locality information contained in the at least one of IDM table and the SAM table.

Another embodiment described herein is a cache-coherent system that includes a plurality of nodes arranged in a multi-dimensional topology, each of the plurality of nodes comprising at least one of a processing element and a memory element, where a first node of the plurality of nodes is a server host and a second node of the plurality of nodes is an expansion box coupled to the server host. At least one of an IDM table and a SAM table is stored in each of the plurality of nodes, where the IDM table comprises locality information of each node relative to the other nodes in the plurality of nodes based on a processing or memory element ID, and where the SAM table comprises the locality information based on memory address ranges. Further, the plurality of nodes are configured to perform data migration operations at a node of the plurality of nodes using the locality information contained in the at least one of IDM table and the SAM table.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
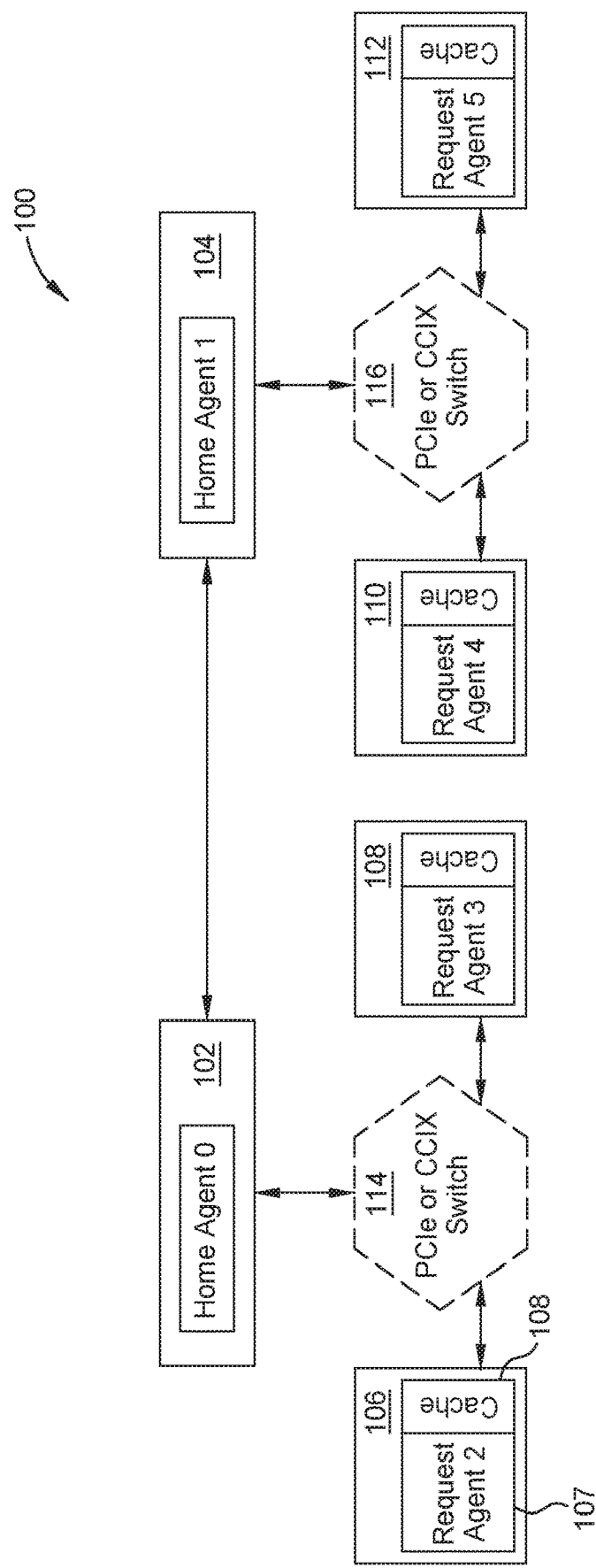
FIG. 1 is an example cache-coherent system, according to embodiments disclosed.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments disclosed herein provide a domain aware data migration scheme between processing elements, memory, and various caches in a CC-NUMA system. The scheme creates domain awareness in data migration operations, such as Direct Cache Transfer (DCT) operation, stashing operation, and in the allocation of policies of snoop filters and private, shared, or inline caches. The scheme defines a hardware-software interface to communicate locality information (also referred herein as affinity information or proximity information) and subsequent hardware behavior for optimal data migration, thus overcoming traditional CC-NUMA limitations.

Specifically, embodiments disclosed herein provide a domain aware data migration scheme in cache-coherent systems. The cache-coherent systems include a plurality of nodes, and each node has a compute element (e.g., processor), a memory element (e.g., memory, cache), or both a compute element and a memory element. In the domain-aware data migration scheme, a multi-dimensional topology for the cache-coherent system is determined, and an ID map (IDM) table and a system address map (SAM) table are generated at boot-time based on the plurality of nodes and the determined topology. The IDM table has locality information of each node relative to other node based on the compute element IDs, and the SAM table also has locality information based on the memory address ranges. The IDM table and SAM table are distributed to the compute and memory elements of the plurality of nodes, so that the hardware has the same information about the determined multi-dimensional topology as the software. Data migration operations are performed at a node of the cache-coherent system using the locality information of the IDM table and the SAM table.

Current methods do not propagate the affinity information of the created topologies back downstream, i.e., the hardware for the compute, cache, and memory elements continue to remain unaware of their surroundings that were discovered and/or configured by the firmware or upper software layers.

As a result, existing hardware, particularly software-transparent caches, continue to operate without this information and the resulting data movement between compute, memory, and caches can be described at most as best-effort. Hardware operating without the affinity information can also lead to inefficiencies in data movement, for example in a cache allocation and eviction behavior. Norse, lack of affinity information can inadvertently result in data movement that undermines the improvements in performance that the software-based affinity optimizations were intended to produce.

Current hardware methods mitigate the non-uniformity inherent in CC-NUMA with the CPUs, Accelerators, and the interconnect having large private caches, shared caches, intermediate/switch caches, local and remote caches, for example. Current methods may further mitigate CC-NUMA by enhancing the cache-coherency protocol such that the protocol enables direct cache-to-cache transfers between Request and Snooped Agents in the system, or the protocol enables Producer-to-Consumer stashing from a source processing element to the destination processing elements' cache. Current methods can also mitigate CC-NUMA with intermediate/switch caches that take advantage of temporal locality by caching local or remote accesses to memory or by holding evicted lines to the intermediate/switch cache in anticipation of a re-reference to that evicted line by a local processing element.

Unlike previous techniques, this domain aware data migration scheme bridges the information gap between hardware and software and aligns hardware data movement with software affinity algorithms. The domain aware data migration scheme solves problems stemming from the lack of information and ad-hoc behavior by hardware by providing a method for software to propagate locality information of the created topologies back downstream via hardware accessible data structures describing locality domains for the compute, cache, and memory elements.

As a result of this domain aware data migration scheme, hardware leverages this information and the domain aware data migration scheme describes domain-aware intelligent data movement between compute, memory, and caches. Hardware and software utilizing this domain aware data migration scheme create efficient usage of resources, data bandwidth and optimal performance. With locality information, hardware re-enforces software-based affinity optimizations by providing optimized data movement between producers and consumers of the data.

FIG. 1 is an example cache-coherent system, according to embodiments disclosed. In certain embodiments, the cache-coherent system 100 is a CC-NUMA system.

In certain embodiments, the cache-coherent system 100 includes home agent nodes 102 and 104, request agent nodes 106, 108, 110, and 112, and switches 114 and 116. The cache-coherent system 100 can include any number of home agent nodes, request agent nodes, and switches. Home agent nodes and request agent nodes are also referred herein generically as nodes. Each node has a processing element or a memory element (or both). For example, each of the request agent nodes has a request agent node 107 (e.g., a processing element) and a request agent cache 109 (e.g., a memory element). In some embodiments, the memory element is a cache, and in other embodiments, the memory element is memory (e.g., DDR4 memory). The switches 114, 116 can be PCIe switches or cache coherent protocol aware switches, such as Cache Coherent Interconnect for Accelerator (CCIX) switches, and in some embodiments can have a memory element (not illustrated). The switches are coupled to the home agent nodes and the request agent nodes. For example, switch 114 is coupled to and communicates with home agent node 102, and request agent nodes 106 and 107, while switch 116 is coupled to and communicates with home agent node 104 and request agent nodes 110 and 112. Similarly, the home agent nodes 102 and 104 communicate with each other through a computer network (not illustrated) (e.g., the Internet) or a cache coherent network such as those enabled by CCIX, QPI/UPI, AMD Infinity Fabric, NVLink, and OpenCAPI.

In certain embodiments, the nodes of the system 100 are cache coherent, and so the data in the memory elements of the nodes are uniform. For example, when one copy of data changes in one of the nodes, the other copies of data in the system 100 also reflect the change.

Figure 2:
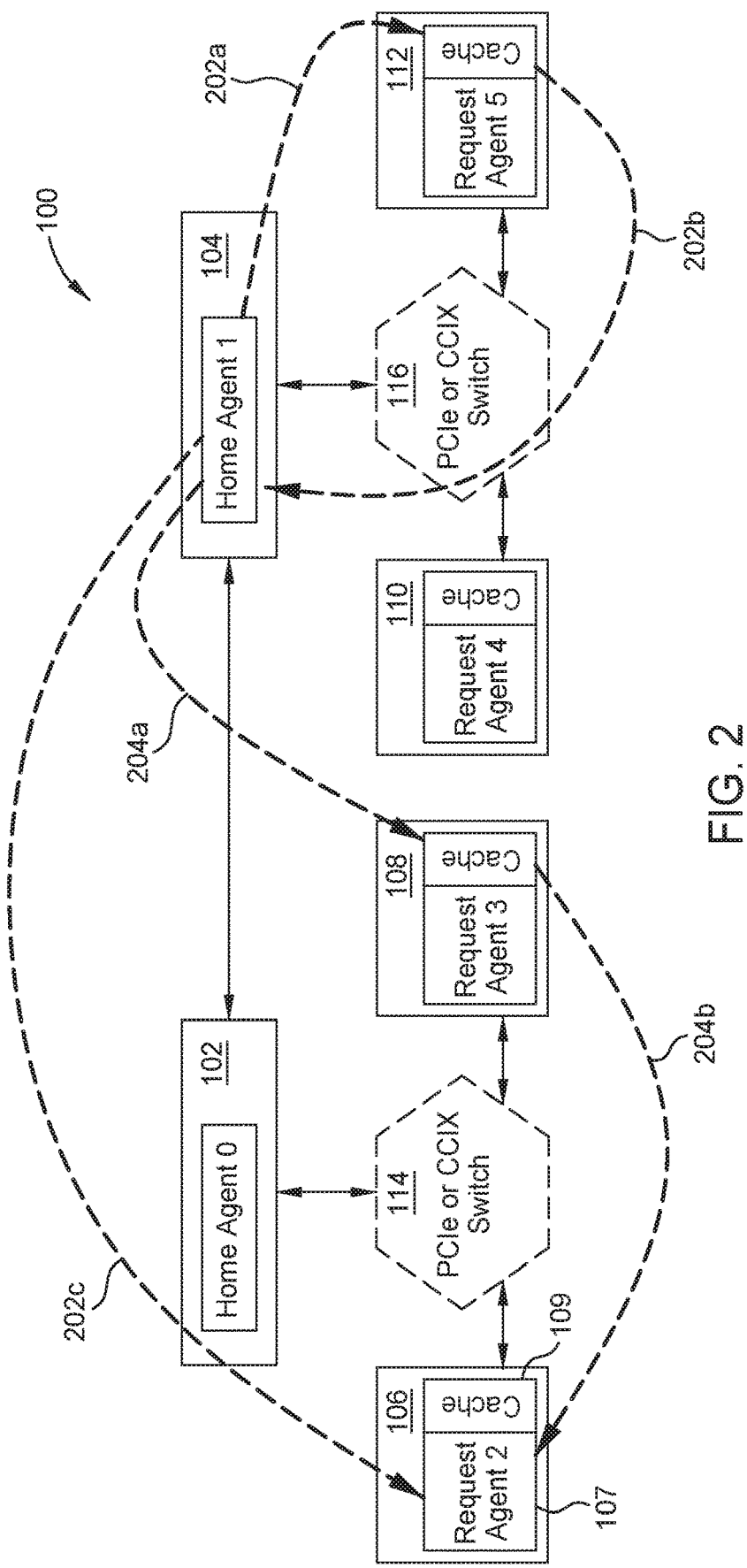
FIG. 2 is an example of a data migration operation in a cache-coherent system, according to embodiments disclosed.

FIG. 2 is an example of a data migration operation in a cache-coherent system, such as the cache-coherent system 100 of FIG. 1, according to embodiments disclosed. For illustrative purposes, the cache-coherent system 100 of FIG. 2 is the same cache-coherent system 100 of FIG. 1. FIG. 2 illustrates the data migration operation when the hardware has locality information and when the hardware does not have locality information.

The data migration operation illustrated in FIG. 2 is a DCT shown by arrows 202a-c, 204a-b. In both example DCTs, request agent node 106 has sent a DCT request message to home agent node 104 because the memory address of the DCT request falls within the memory address range of a memory element of the home agent node 104. In the example DCT, the home agent node 104 Snoop Filter Directory indicates request agent node 108 and request agent node 112 have shared copies.

As mentioned, FIG. 2 uses arrows 202 to illustrate the resulting data movement if the request agent node 106 and the home agent node 104 have locality information. After the home agent node 104 receives the DCT request from request agent node 106 with the memory address, the home agent node 104 knows, from the locality aware Snoop Filter Directory, that the request agent node 108 and request agent node 112 both have copies of the data at the memory address. The home agent node 104 also knows, from the locality information, that the request agent node 108 is closer to the request agent node 106 than request agent node 112. Accordingly, the home agent node 104 sends a DCT snoop to request agent node 108 as shown by arrow 204a, and request agent node 108 sends the cached copy of the data to request agent 106 as shown by arrow 204b.

As mentioned, FIG. 2 uses arrows 202 to illustrate the resulting data movement if the home agent node 104 and the request agent node 106 did not have locality information, like in current cache-coherent systems. After the home agent node 104 receives the DCT request from request agent node 106 with the memory address, the home agent node 104 has no information on how to decide on which node to use to effect the direct cache transfer because the home agent node 104 knows that request agent node 108 and request agent node 112 both have copies of the data at the memory address. Accordingly, home agent node 104 sends a DCT snoop to request agent node 112 as shown by arrow 202a because the Snoop Filter in the home agent node 104 indicated that the request agent node 112 as the node having a cached copy of the data at the memory address. Because the particular topology of the system 100 has only one route path between request agent node 112 and request agent node 106, the request agent node 112 then sends the cached copy of the data via the home agent 104, as shown by arrow 202b, to the request agent 106, as shown by arrow 202c.

In general, for coherency operations, an address typically has only one home. The home node may further track using a snoop filter, which addresses have their data cached in other request agent caches, and also may track, using a snoop filter directory, which request agents have cached data for each of those addresses. In the example above illustrated by the arrows 202, the request agent node 106 cannot know a priori that it should send the DCT request to the request agent node 112. Instead, the request agent node 106 first needs to have that address be routed to the home node 102.

While a DCT can use both the IDM and SAM tables (the home node may need information contained in both of these tables), a DCT can also be performed using only the IDM table. For example, some DCTs refer to modified data where only the IDM table is sufficient.

Figure 3:
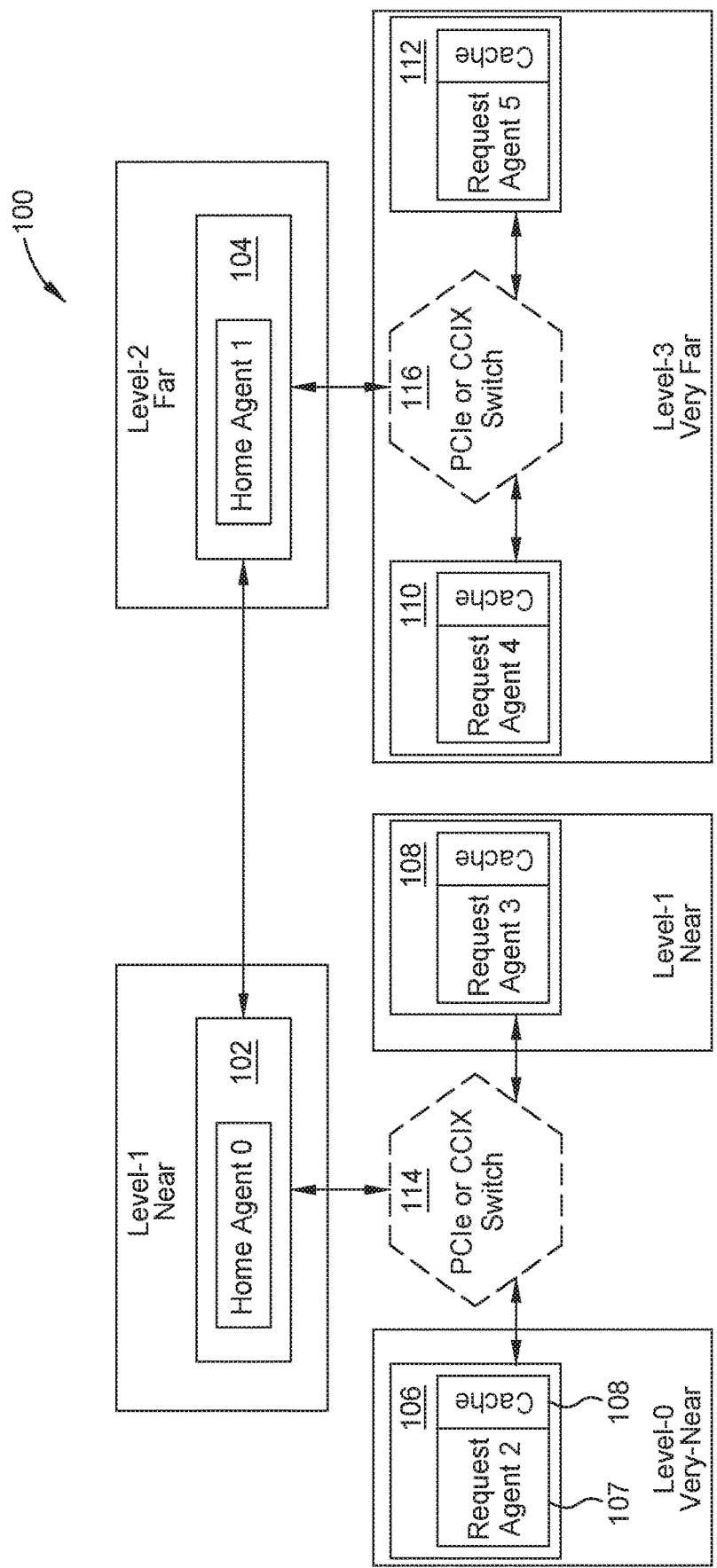
FIG. 3 is an example topology of a cache-coherent system, according to embodiments disclosed.

FIG. 3 is an example topology of a cache-coherent system, which can be used in data migration operations such as the data migration operation of FIG. 2, according to embodiments disclosed. For illustrative purposes, FIG. 3 depicts a topology of the cache-coherent system 100 shown in FIGS. 1 and 2.

In certain embodiments, each node of the cache-coherent system 100 knows locality of all other nodes. For example, the system identifies the affinity (or proximity) of the other nodes of the cache-coherent system 100 to request agent node 106. The system identifies that request node 106 is "very near" to itself, in that there is little to no latency when data migrates within its own memory element. The system identifies that request agent node 108 and home agent node 102 are "near" to request agent node 106 because request agent node 108 and home agent node 102 are two connections away from request agent node 106. The system identifies that home agent node 104 is "far" from request agent node 106 because home agent node 104 is three connections away. That is, a message from request agent node 106 needs to travel to the switch 114, then to the home agent node 102, and then to home agent node 104. The system identifies that request agent nodes 110 and 112 are "very far" from request agent node 106 because request agent node 110 and 112 are five connections away. That is, a message from request agent node 106 needs to travel to the switch 114, then to the home agent node 102, then to home agent node 104, then to switch 116, and then finally to request agent nodes 110 or 112. While FIG. 3 illustrates four levels of locality, the domain aware data migration scheme can have any number of levels of locality.

In certain embodiments, the system 100 represents the locality levels ("very near," "near," "far," and "very far") by data bits when the system sends the locality information (including the locality level of a node to another node) to the compute element of each node. For example, the system uses two bits to represent the locality level of the nodes of the system 100 to request agent node 106: "11" represents "very near," "10" represents "near," "01" represents "far," and "00" represents "very far." The system can use any number of bits to represent any number of locality levels. "Very near," "near," "far," and "very far" are relative terms, and are not indicative of an absolute distance. The levels discussed with reference to FIG. 3 can be represented by any number of bits. In some embodiments, the locality levels can correspond to absolute distances from a node.

Figure 4:
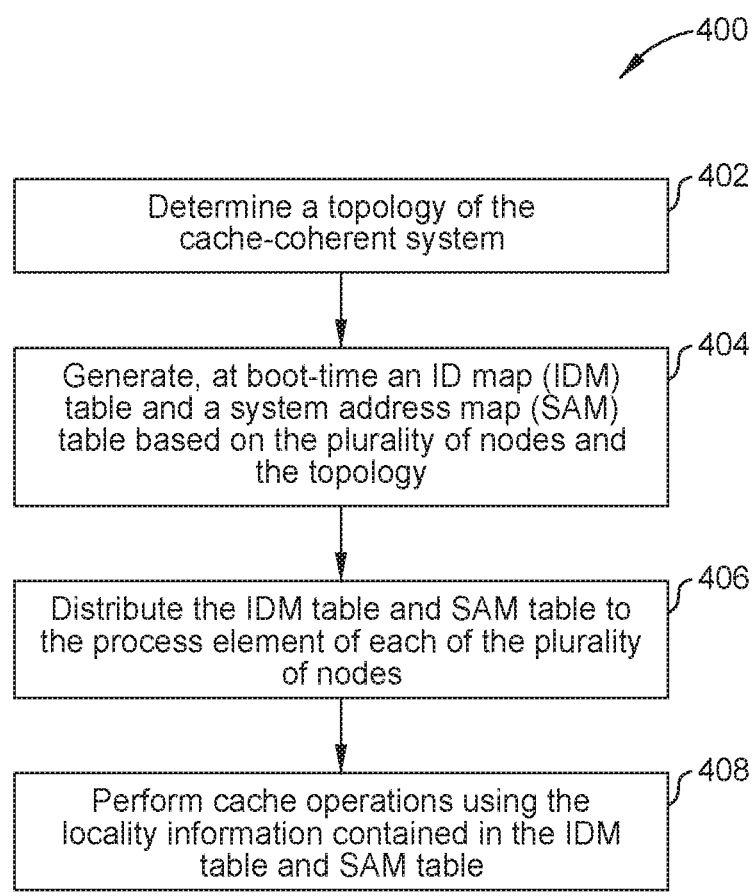
FIG. 4 is a flow chart of example operations for a cache-coherent system, according to embodiments disclosed.

FIG. 4 is a flow chart of example operations 400 for a cache-coherent system (e.g., system 100 of FIGS. 1-3), according to embodiments disclosed. In one embodiment, operations 400 facilitate domain-aware data migration in a cache-coherent system, and therefore are completed prior to a domain-aware data migration operation. In one embodiment, a control fabric performs operations 402-406 to establish and configure a domain-aware data migration. The control fabric can include a private configuration network that establishes the cache-coherent system. In another embodiment, a centralized host or agent (or a combination of a home or a request agent) (e.g., a centralized controller) establishes the cache-coherent system. Further, the control fabric or central controller can use the same pathways that transmit the coherency traffic to also configure the cache-coherent system. For illustrative purposes, operations 400 are described as performed by the system 100.

Operations 400 begin, at step 402, with the control fabric or central controller determining a multi-dimensional topology of the cache-coherent system. In one embodiment, a multi-dimensional topology comprises locality information from one node to other nodes of the system. In certain embodiments, the multi-dimension topology comprises locality information for each node from each node, as compared to a one-dimensional topology, which includes the locality information of the nodes from a home agent node. The multi-dimensional topology can use any number of locality levels to describe the relative distance of a node to other nodes of the system.

At step 404, operations 400 continue with the control fabric or central controller generating, at boot-time, an ID map (IDM) table and a system address map (SAM) table based on the plurality of nodes and the topology. In certain embodiments, the control fabric or central controller organizes the multi-dimensional topology into two different tables so that the different nodes of the system 100 can leverage the locality information of the topology based on different information. That is, the IDM table includes locality information of each node relative to the other nodes based on the compute element ID of each node, and the SAM table includes locality information based on memory address ranges of each node. Further details about the IDM table and the SAM table are provided below with respect to FIG. 9.

At step 406, operations 400 continue with the control fabric or central controller distributing the IDM table and the SAM table to the compute element of each node of the plurality of nodes. In certain embodiments, the control fabric or central controller distributes the IDM table and the SAM table to the compute elements of home agent nodes and request agent nodes. In some embodiments, the control fabric or central controller distributes the tables to switches. In some embodiments, the compute element comprises a processor or a Generic Initiator. In one embodiment, the control fabric or central controller distributes customized IDM tables and SAM tables to the compute elements of the nodes. That is, instead of distributing the entire IDM table and SAM table to each compute element of the nodes, the control fabric or central controller distributes rows (or columns) corresponding to the locality information for the node. For example, each row of the IDM table comprises locality information (or the relative distance) of each node from a particular node (e.g., distance from request agent node 106 to home agent node 102, distance from request agent node 106 to request agent node 112), and the control fabric or central controller distributes the rows of the IDM to the nodes corresponding to that row (e.g., row having locality information from the origin node to other nodes). Accordingly, in this example, the compute element of each node has a customized IDM table with locality information of every node in the system. Similarly, the compute element of each node can receive a customized SAM with locality information of every node in the system.

At step 408, operations 400 continue with the home agent nodes, switches, and request agent nodes performing data migration operations using the locality information in the IDM table and the SAM table. Further details about the IDM table and the SAM table are provided below with respect to FIGS. 9-11.

In some embodiments, system 100 includes new nodes, which affect the topology of the system. The domain aware data migration scheme takes into account the addition and the removal of nodes in the cache-coherent system 100s. Accordingly, in certain embodiments, when the system 100 includes a new node, the system identifies the new node, and updates the IDM table and the SAM table with locality information of the new node to the other nodes of the system. In one embodiment, one node (either a home agent node or a request agent node) identifies the new node and updates of the tables before the node distributes the updated IDM table and updated SAM table to the other nodes of the system. In another embodiment, each node identifies the new node of the system and updates its own IDM table and SAM table with locality information for the new node. Similarly, when a node is removed from the cache-coherent system, the system identifies the removed node and updates the IDM table and SAM table by removing the row and column corresponding to the removed node in the IDM and SAM tables.

Moreover, the system 100 can be reconfigured without adding or removing nodes. Reconfiguration is creating a new topology out of the same elements (e.g., two connected switches). If the bulk of the traffic has a characteristic that it is primarily between request agents (e.g., direct cache transfers), the control fabric or central controller reconfigure the elements in a new topology. Using FIG. 1 as an example, if the bulk of the traffic is between the Request Agent 5 and the Home Agent 0, the switches 116 and 114 can be connected. This enables a direct cache transfer between those request agents to bypass at least one of the Home Agents (e.g., the Home Agent 1). Once the new topology is connected, the control fabric or central controller then updates the SAM and IDM tables so data can be migrated from node 112, to switch 116, to switch 114, and to node 102. What was once a five hop DCT transfer between Request Agent 5 and Request Agent 2 is now a three hop transfer with switches 116 and 114 being directly connected.

Thus, unlike previous systems where the topology is hard coded, here the topology can be reconfigured and updated SAM/IDM tables can distributed to the affected nodes. As such, the affinity characteristics of the nodes in the system are changed as the topology is changed.

Figure 5A:
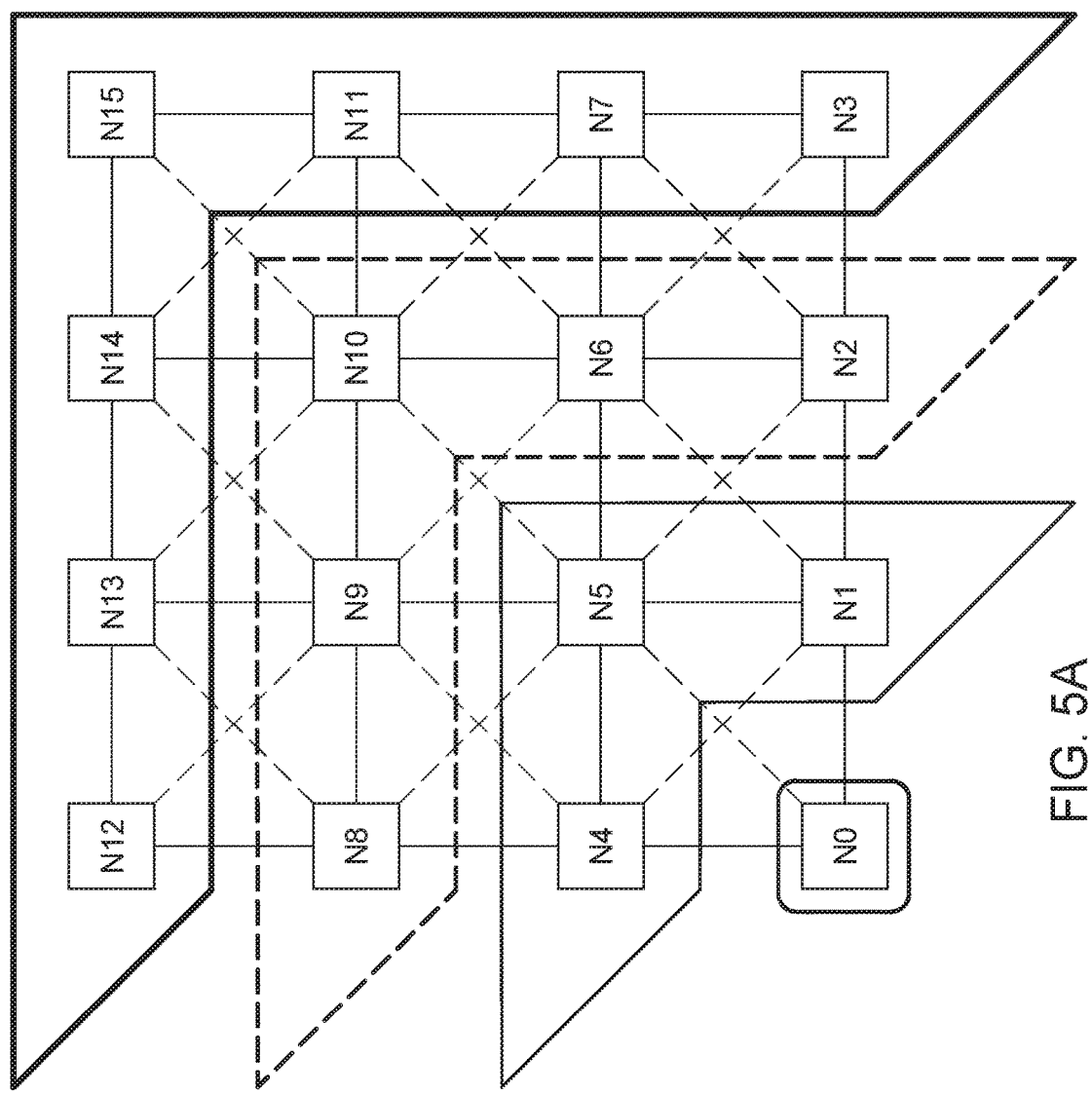
FIGS. 5a and 5b are an example graphical representation of a topology of a cache-coherent system, according to embodiments disclosed.

FIG. 5a is an example graphical representation of a topology of a cache-coherent system, such as system 100 of FIGS. 1-3, which the system determines for the domain aware data migration scheme, according to embodiments disclosed. FIG. 5a illustrates a cache-coherent system 500 with sixteen nodes, and the nodes can comprise either home agent nodes or request agent nodes. In certain embodiments, the system 500 comprises a fully-connected mesh, so that each node has a path of communication to other nodes in the system 500, directly or indirectly. For example, Node N0 can communicate with node N15 via nodes n5 and n10. FIG. 5a illustrates the locality information from origin node N0 to the other nodes (N1-N15) of the system 500. Using the "very near," "near," "far," and "very far" relative distance levels from FIG. 3, node N0 is "very near" to itself; nodes N1, N4, and N5 are considered "near" to node N0 because they are only one connection away from node N0; nodes N2, N6, N8, N9, and N10 are considered "far" from node N0 because they are two connections away from node N0; and nodes N3, N7, N11, N12, N13, N14, and N15 are considered "very far" from node N0 because they are three connections away from node N0.

Figure 5B:
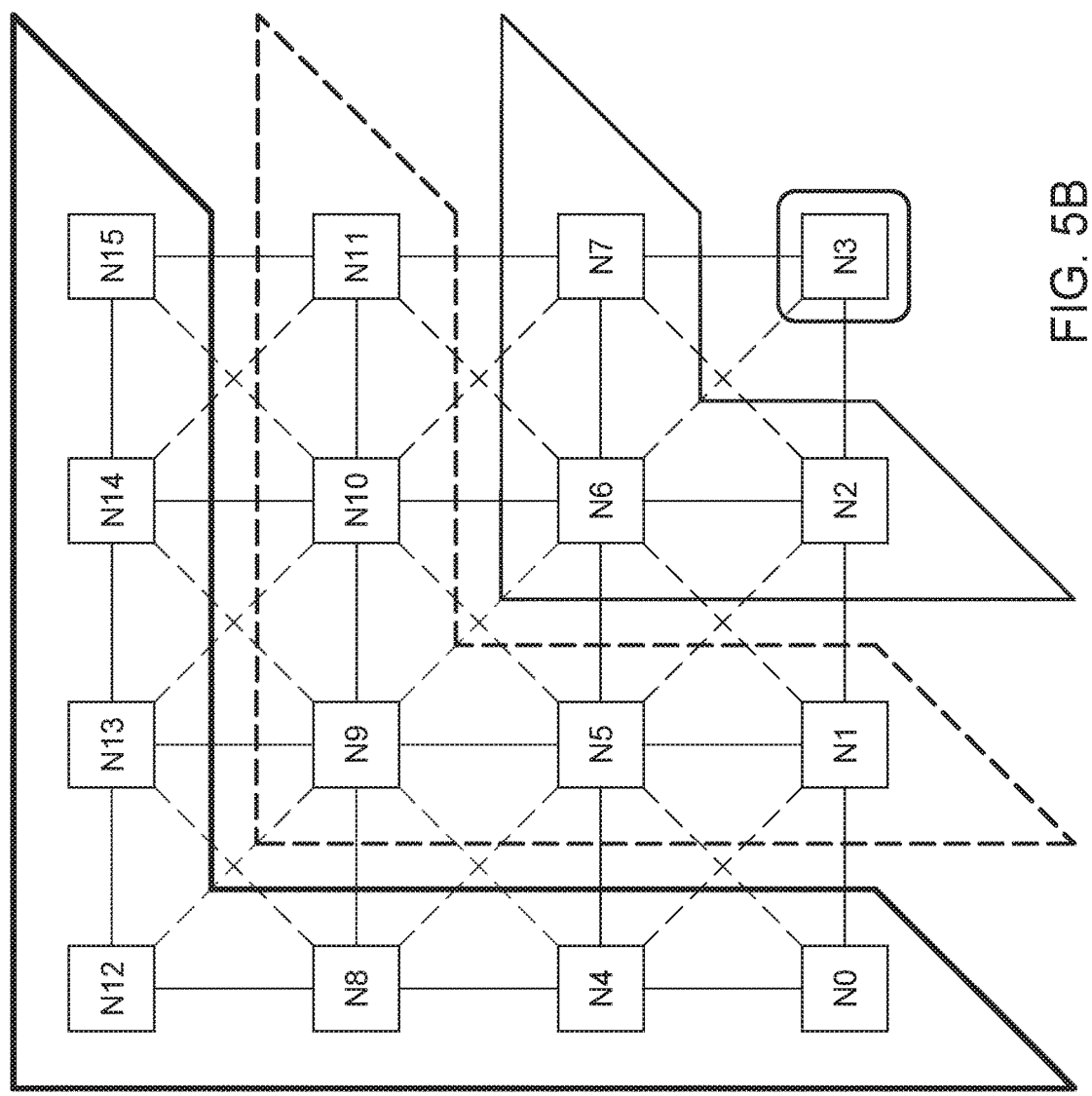

Similar to FIG. 5a, FIG. 5b is an example graphical representation of a topology of a cache-coherent system for the domain aware data migration scheme, according to embodiments disclosed. For illustrative purposes, FIG. 5b illustrates the cache-coherent system 500 shown in FIG. 5a, with sixteen nodes in a fully-connected mesh. Like with FIG. 5a, FIG. 5b illustrates the locality information from a single node to the other nodes of the system 500; however, the locality information focuses on Node N3 as the origin node. In certain embodiments, the system determines the topology of the cache coherent system regardless of the type of node (e.g., home agent, request agent). Using the "very near," "near," "far," and "very far" relative distance levels from FIG. 3, node n3 is "very near" to itself; nodes N2, N6, and N7 are considered "near to node N3 because they are one connection away from node N0; nodes N1, N5, N9, N10, and N11 are considered "far" from node N3 because they are two connections away from node N3; and nodes N0, N4, N8, N12, N13, N14, and N15 are considered "very far" from node N3 because they are three connections away from node N0.

As illustrated in FIGS. 5a and 5b, the domain aware data migration scheme determines the locality information of each node, regardless of the node's type. Doing so adds to the multi-dimensionality aspect of the topology of the system 500.

Figure 6:
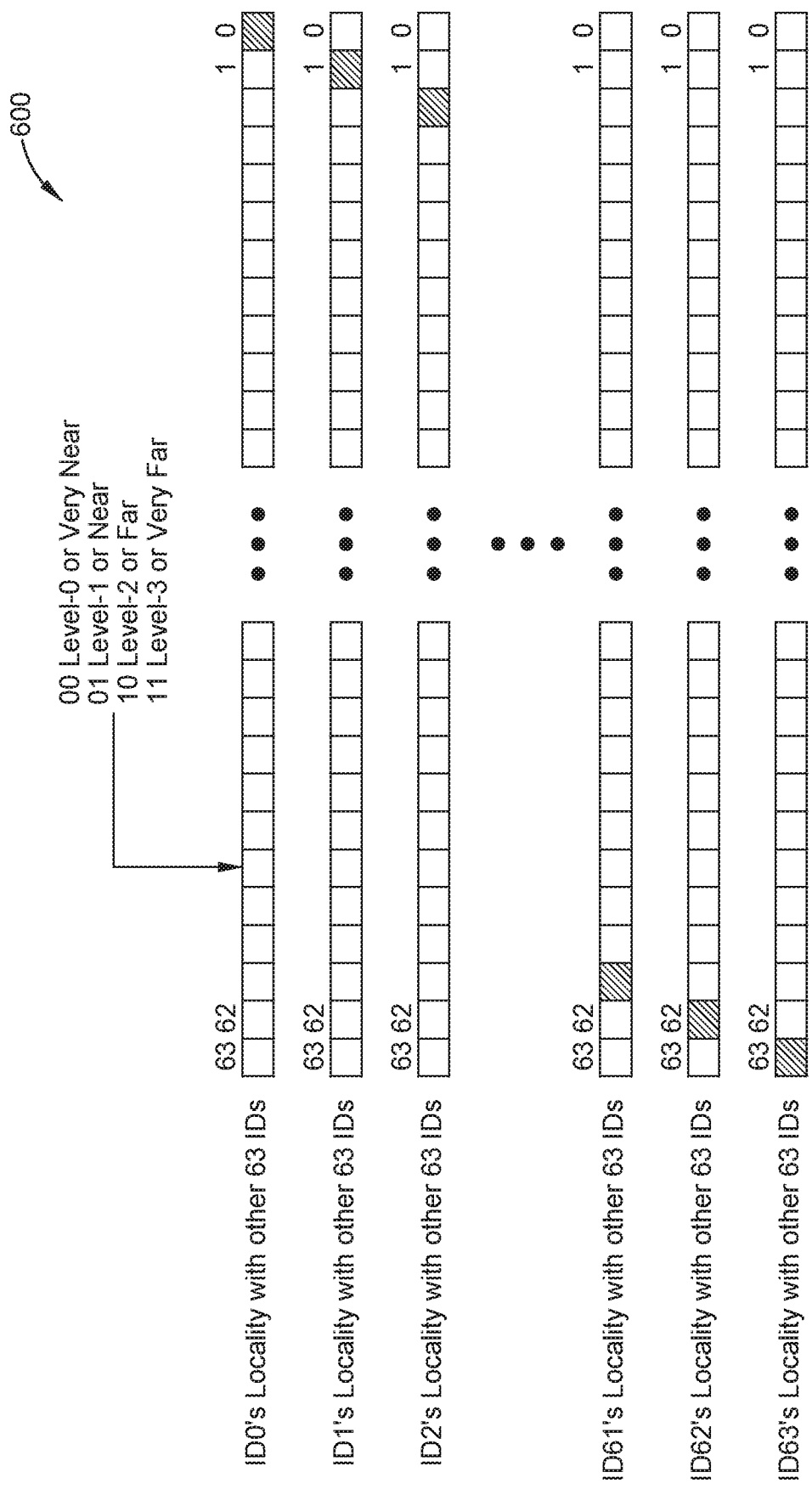
FIG. 6 depicts a matrix of locality information of a cache-coherent system, according to embodiments disclosed.

FIG. 6 depicts a matrix of locality information generated from the topology of a cache-coherent system, such as the topology of FIGS. 5a and 5b, according to embodiments disclosed. The matrix 600 of FIG. 6 is based on a 64-node cache-coherent system and uses the "very near," "near," "far," and "very far" relative distance levels from FIG. 3. However, as mentioned previously, the cache-coherent system can have any number of nodes, and thus the matrix of locality information can have any number of rows and columns corresponding to the number of nodes of the system. Also, as mentioned previously, the domain aware data migration scheme can use any number of levels for relative distance from a particular node, and thus the contents of each cell of the matrix can use any number of bits to describe the number of levels of a particular node from another node.

In certain embodiments, the matrix 600 comprises an additional column comprising information about each row of the matrix. That is, the additional column indicates whether the matrix 600 is an IDM table or a SAM table. For example, for an IDM table, the additional column comprises compute element ID of each node, and for a SAM table, the additional column comprise memory address ranges of each node. In the exemplary embodiment of FIG. 6, the matrix 600 is an IDM table with 64 rows and 64 columns and each cell of matrix 600 contains two bits of data indicating the locality information of each node to a node in the system. Accordingly, for each node, the IDM table uses 128 bits, and thus with 64 nodes in the systems, the IDM table uses 8 Kbits or 256 DWords.

Figures 7, 8:
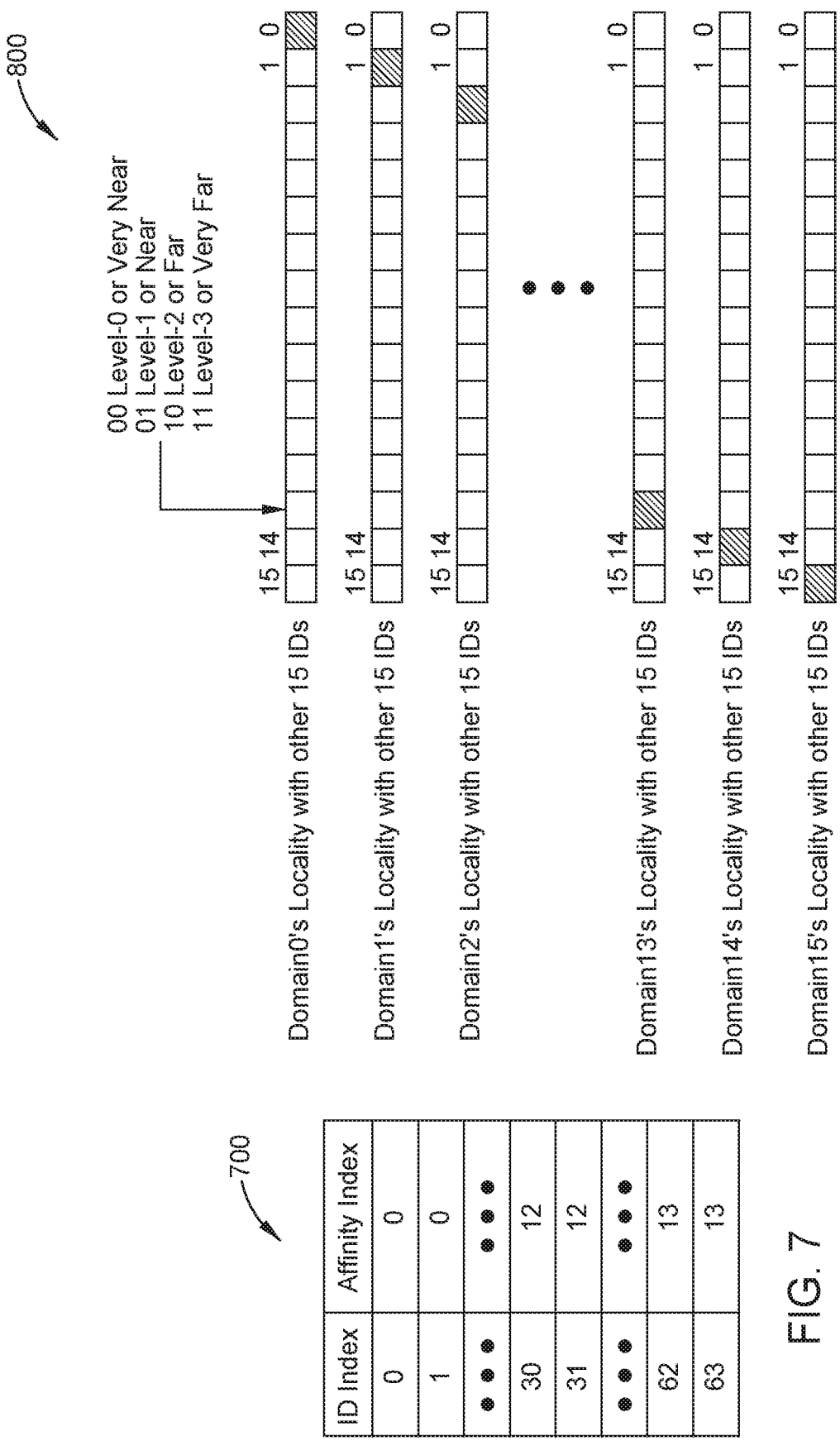
FIG. 7 illustrates an affinity table, according to embodiments disclosed.
FIG. 8 depicts the compression of a matrix of locality information of a cache-coherent system, according to embodiments disclosed.

FIGS. 7 and 8 depict the compression of a matrix of locality information of a cache-coherent system, such as the matrix 600 of FIG. 6, according to embodiments disclosed. In certain embodiments, the system compresses the matrix of locality information so that when the system distributes the matrix, the system distributes fewer bits as compared to distributing the uncompressed matrix. As mentioned previously, the matrix of locality information can be an IDM table or a SAM table, and because the system distributes both an IDM table and a SAM table to each node of the system, the system distributes twice fewer bits.

FIG. 7 illustrates an affinity table 700 and FIG. 8 illustrates a compressed matrix 750. In certain embodiments, the domain aware data migration scheme compresses a matrix (e.g., an IDM table, a SAM table) by assigning an affinity domain to each node. In some embodiments, an affinity domain comprises nodes having the same relative distance from an origin node, and the system can have any number of affinity domains. For example, nodes N12-N15 are "very far" from node N0, and are therefore in affinity domain 3 comprising the nodes "very far" away from node N0. In such embodiments, the affinity domain is based on the origin node or the node from which distance is measured, so different nodes are considered "very far" for different origin nodes. In certain embodiments, the system assigns affinity domains based on the origin node, so a node can be assigned to multiple affinity domains.

The compressed matrix 800, like the matrix 600 of FIG. 6, can have any number of rows and any number of columns. Based on the compression of the matrix 600 of FIG. 6, the compressed matrix 800 can comprise an additional column comprising information about each row of the compressed matrix (e.g., columns comprising compute element IDs, column comprising memory address ranges), which indicates whether the compressed matrix 800 is an IDM table or a SAM table.

In the exemplary embodiment of FIG. 7, the system compresses the locality information of each node by assigning a locality domain to the node. As illustrated in affinity table 700, the system assigned nodes N0 and N1 with an affinity domain 0, N30 and N31 with an affinity domain 12, and N62 and 63 with affinity domain 13. In certain embodiments, the system uses the affinity table to compress the matrix to create the compressed matrix 800. Based on the affinity table 700, the compressed matrix 800 is an IDM table with 16 rows and 16 columns for each domain generated by the compression process, and each cell of the compressed matrix 800 contains two bits of data indicating locality information. For each domain, the compressed matrix 800 uses 32 bits for each domain, and thus in total, the compressed matrix 800 uses 512 bits or 16 DWords.

Figure 9:
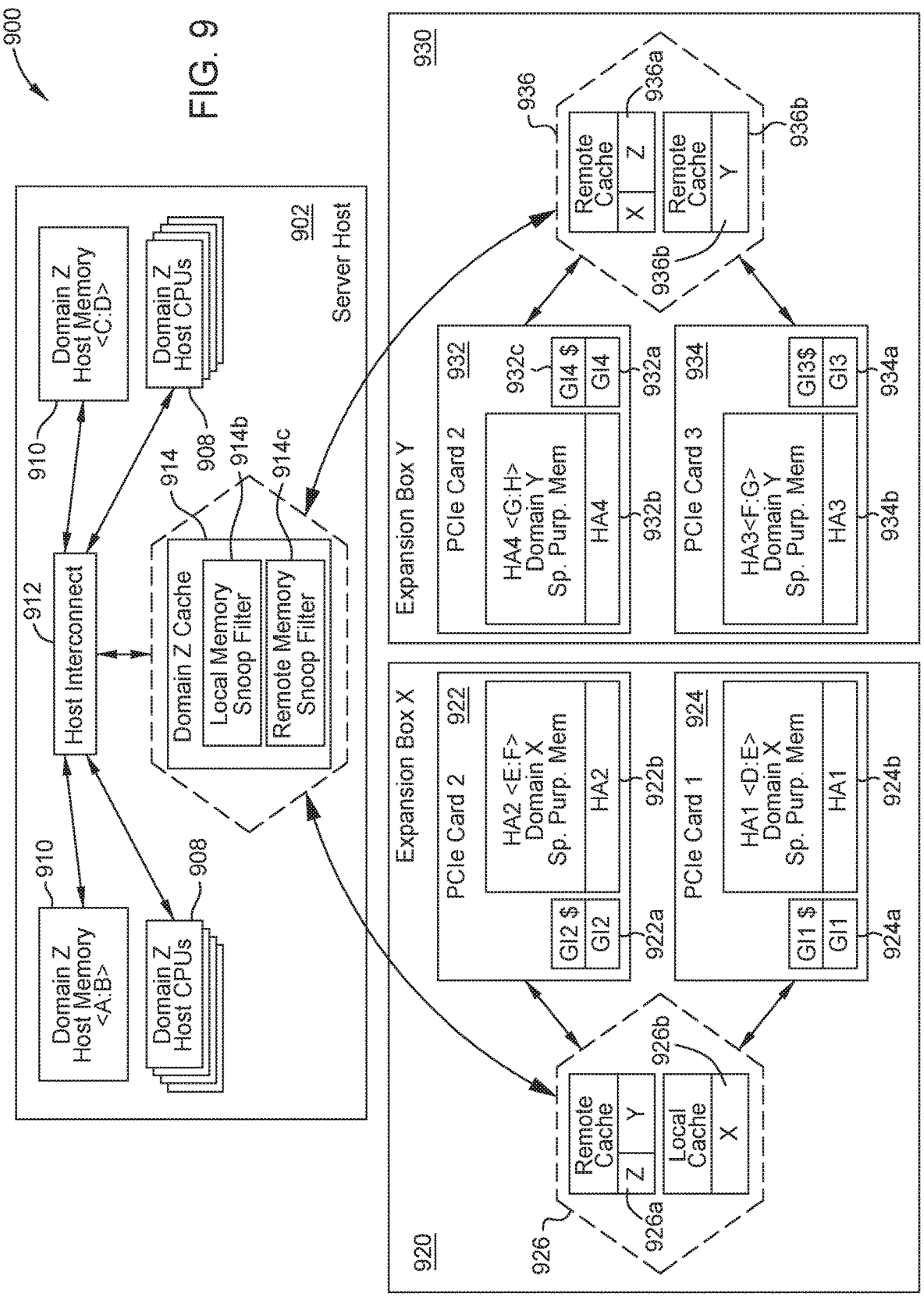
FIG. 9 illustrates an example CC-NUMA system, according to embodiments disclosed.4

FIG. 9 illustrates an example CC-NUMA system, according to embodiments disclosed. In FIG. 9, the CC-NUMA system 900 uses affinity domains discussed in FIGS. 7 and 8 to group compute elements and memory elements.

The example system 900 shows a server host 902 with compute, memory, and cache elements attached to Expansion Box 920 and Expansion Box 930, each of which has multiple cards with accelerator and compute and memory elements. In certain embodiments, the server host includes any number of host CPUs 908 and any number of host memory 910 having any memory address range (e.g., <A:B>, <C:D> where A, B, C, D are memory addresses). In certain embodiments, the host CPUs 908 and host memory 910 communicate with a host interconnect 912, and the host interconnect in turn communicates with a cache coherency protocol aware switch 914. In order to communicate with the host interconnect 912 and other components of the server host 902 through the host interconnect 912 (e.g., host memory 910, host CPUs 908), all communications pass through the host switch 914. Accordingly, with the locality information, the system 900 can assign an affinity domain to the components of the server host 902 because communication to the components of the server host 902 passes through a single switch. In FIG. 9, the system 900 assigns components of the server host 902 to affinity domain Z. Consequently, data and resources in components of the server host 902 are also in affinity domain Z, which is the local domain for components of the server host 902.

In certain embodiments, the Expansion Box 920 includes nodes 922, 924 and a cache-coherency protocol aware switch 926. In certain embodiments, the nodes 922, 924 are PCIe cards. The nodes 922, 924 can be accelerator cards or any device having a compute element and a memory element, as described previously with reference to FIG. 1. The nodes 922, 924 include a Generic Initiator 922a, 924a and a memory element 922b, 924b with a certain memory address range. For example, node 922 comprises a memory element 922b with memory address range <E:F> and node 924 comprises a memory element 924b with memory address range <D:E>. In some embodiments, the memory elements 922b, 924b are specific purpose memory. In certain embodiments, the cache-coherency protocol aware switch 926 includes a remote cache 926a and a local cache 926b. Similar to the server host 902, the system 900 can assign an affinity domain to the components of the Expansion Box 920 because communication to the components of the Expansion Box 920 passes through a single switch. In FIG. 9, the system 900 assigns components of the Expansion Box 920 to affinity domain X. Consequently, data and resources in components of the Expansion Box 920 are also in affinity domain X, which is the local domain for components of the Expansion Box 920.

In certain embodiments, Expansion Box 930 includes nodes 932, 934 and a cache-coherency protocol aware switch 936. The nodes 932, 934 can be accelerator cards or any device having a compute element and a memory element, as described previously with reference to FIG. 1. In certain embodiments, nodes 932, 934 are PCIe cards. The nodes 932, 934 include a Generic Initiator 932a, 934a and a memory element 932b, 934b with a certain memory address range. For example, node 932 comprises a memory element 932b with memory address range <G:H> and node 934 comprises a memory element 934b with memory address range <F:G>. In some embodiments, the memory elements 932b, 934b are specific purpose memory. In certain embodiments, the cache-coherency protocol aware switch 936 includes a remote cache 936a and a local cache 936b. Similar to the server host 902, the system 900 can assign an affinity domain to the components of the Expansion Box 930 because communication to the components of the Expansion Box 930 passes through a single switch. In FIG. 9, the system 900 assigns components of the Expansion Box 930 to affinity domain Y. Consequently, data and resources in components of the Expansion Box 930 are also in affinity domain Y, which is the local domain for components of the Expansion Box 930.

In certain embodiments, the cache coherency protocol aware switch 914 connects the server host 902 to the Expansion Box 920 and Expansion Box 930. Similarly, the cache coherency protocol aware switches 926 and 936 respectively connect Expansion Box 920 and Expansion Box 930 to their respective individual nodes.

Because the system 900 assigns affinity domains to components of the server host 902, Expansion Box 920, and Expansion Box 930, the domain aware data migration scheme needs corresponding affinity domain assignment of the data in the system 900. That is, because the system is cache-coherent, the system 900 maintains uniformity of data stored in the caches of the system 900. In certain embodiments, the caches of the system 900 do not maintain copies of all the data in the system, but more than one cache can have a copy of data. For example, cache 932c can have a copy of data located at a memory address in host memory 910, and the system 900 maintains the coherency of each copy of the data. In certain embodiments, the switches 926, 936 maintain information about data in the system, including the affinity domain assignment of the memory elements in which data is located. In such embodiments, the cache coherency protocol aware switches 926 and 936 can include cache resources for data in remote domains (e.g., remote caches 926a, 936a) and for data in a local domain (e.g., local caches 926b, 936b). In some embodiments the remote caches 926a, 936a logically separate the information about data in different domains. In some embodiments, the separation of information can occur physically. For example, the switch 936 includes a remote cache 936a and a local cache 936b which are physically distinct caches. In some embodiments, the switches each comprises a single memory element for the remote caches 926a, 936a and local caches 926b, 936b, and logically separates cache resources for data in remote domains and for data in the local domain. That is, the remote cache data and the local cache data can be stored in the same physical cache which is logically separated into different caches. One advantage of two logical caches is that if one of the caches is almost full, the node can reallocate memory from an underutilized cache to the over utilized cache (e.g., increase the size of the local cache and reduce the size of the remote cache). As such, the cache sizes may be different.

Because the system 900 is cache-coherent, and the system 900 maintains uniformity of data stored in the caches of the system 900, the switch 914 can have a first Snoop Filter Cache (e.g., Local Memory Snoop Filter 914b) to track the local (i.e., Domain Z) addresses that are cached remotely in Domain X and Y caches in the expansion boxes 920 and 930 as well as a second Snoop Filter Cache (e.g., Remote Memory Snoop Filter 914c) to track remote (i.e., Domains X and Y) addresses that cached locally in CPUs 908. Similarly, switches 926 and 936 can also include Snooper Filter Caches for tracking local and remote cached lines. In certain embodiments, the Snoop Filter Caches track cached lines in the system, including the affinity domain assignment of the cached lines. In such embodiments, the Snoop Filter Caches can include tracking resources for cached data in remote domains and tracking resources for cached data in a local domain. In some embodiments the Snoop Filter Caches logically separate the tracking resources for different domains. In some embodiments, the separation of information can occur physically. In some embodiments, the switches 914, 926, 936 each comprises a single Snoop Filter Cache, and logically separates tracking resources for cached data in remote domains and for cached data in the local domain.

The Local Memory Snoop filter 914b and the Remote Memory Snoop Filter 914c can be physically distinct caches or memories, or one physical cache that is logically divided into two caches. One advantage of using two logical caches is that if, for example, the Local Memory Snoop Filter 914b is near capacity, unused tracking resources assigned to the Remote Memory Snoop Filter 914c can be reassigned to track memory addresses in the Local Memory Snoop Filter 914b.

In some embodiments, the hypervisor (not illustrated) or OS software that runs the system 900 uses locality data structures from UEFI or ACPI, the locality information of elements in the system 900. For example, the ACPI System Resource Affinity Table (SRAT), and its associated Processor, Memory, and Generic Initiator Affinity Structures, indicate the affinity domain identifiers of the elements in the system, whereas the ACPI System Locality Distance Information Table (SLIT) indicates the relative distance between all affinity domains. That is, the system identifies which compute elements, memory elements, and optionally cache elements, exist, and the locality of the elements to each other. In certain embodiments, the compute elements include the host CPUs 908 and Generic Initiators 922a, 924a, 932a, 934a.

Using the locality information from firmware data structures, the system 900 creates and maintains locality information as the system 900 enumerates the CPU and/or Generic Initiator elements and creates an IDM table of the compute elements of the system 900 and a system/address map (SAM) of the main or specific-purpose memory elements in the system 900.

In certain embodiments, compute elements, such as nodes, can be hotplugged, causing updates to the IDM table with new enumeration and locality information. Similarly, memory elements can also be hotplugged causing updates to the IDM and SAM with the new address mapping and locality information. In certain embodiment, the system 900 can dynamically create new topologies over time and thus dynamically change the locality information as well. The embodiments described allow hardware to seamlessly adjust their data movement to align with the new locality information.

Table 1 below illustrates an example IDM table that the system 900 generates and distributes to the hardware based on the domain aware data migration scheme, so that the system 900 can optimize ID-based operations using the locality information. In certain embodiments, Table 1 is a compressed IDM table and provides locality information based on the ID of the process elements of the system 900. While not illustrated, the server host 902 comprises n CPUs 908 in affinity domain Z. Further, although not shown specifically in FIG. 9, the Table 1 includes Home Node identifiers which are proxy identifiers for the memory homed at these Home Nodes and allows Home Node Z to distinguish between same node CPUs in Domain Z and the remote node Generic Initiators in Domains X and Y.

TABLE 1

Example IDM Table

| ID | Affinity Domain |
|---|---|
| CPU0 | Z |
| CPU1 | Z |
| ... | Z |
| CPUn | Z |
| Generic Initiator 1 | X |
| Generic Initiator 2 | X |
| Generic Initiator 3 | Y |

TABLE 1-continued

Example IDM Table

| ID | Affinity Domain |
|---|---|
| Generic Initiator 4 | Y |
| Home Node 1 | Z |
| Home Node 2 | X |
| Home Node 3 | Y |
| Switch Cache X | X |
| Switch Cache Y | Y |
| Switch Cache Z | Z |

Further, the IDM table can include affinity domain information for other components in the system such as internal memory elements such as private cache and external memory elements (the backing store of cached data).

Similarly, Table 2 below illustrates an example SAM table data structure that the system 900 makes available to the hardware based on this domain aware data migration scheme, so that the system 900 can optimize address-based operations using the locality information. In certain embodiments, Table 2 is a compressed SAM table and provides locality information based on the memory address ranges of the memory elements of the system 900.

TABLE 2

Example SAM Table

| Address <Start:End> | Affinity Domain |
|---|---|
| <A:B> | Z |
| <C:D> | Z |
| <D:E> | X |
| <E:F> | X |
| <F:G> | Y |
| <G:H> | Y |

Figure 10:
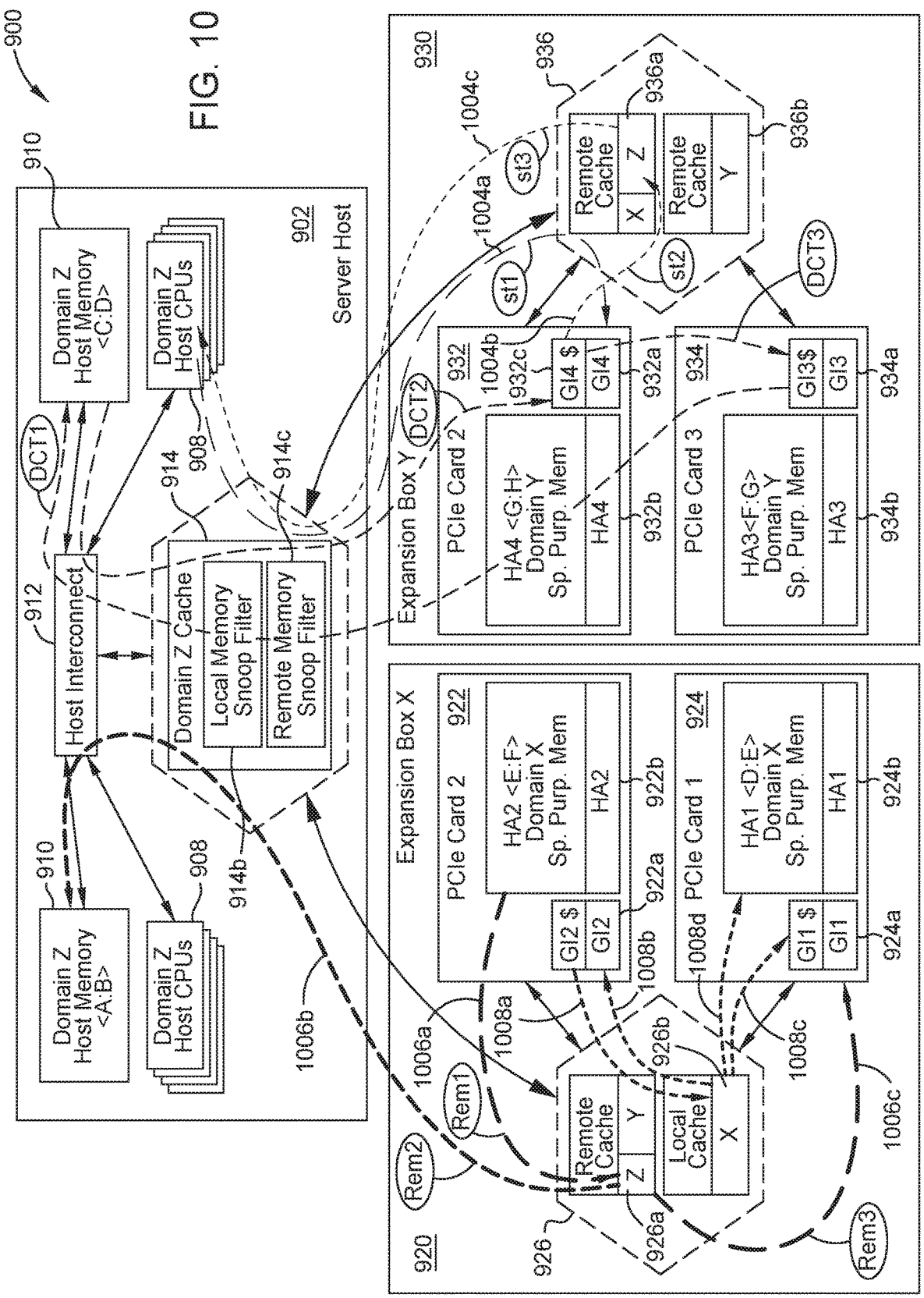
FIG. 10 illustrates an example domain-aware data migration operations in a CC-NUMA system, according to embodiments disclosed.

FIG. 10 illustrates example domain-aware data migration operations in a CC-NUMA system, according to embodiments disclosed. For illustrative purposes, FIG. 10 uses the CC-NUMA system 900 as illustrated in FIG. 9.

In certain embodiments, domain-aware data migration operations include DCT, stashing, snoop filtering, and inline caching operations that apply affinity domain information of optimal data movement between compute, cache, and memory elements.

FIG. 10 illustrates a locality-aware direct cache transfer (DCT) operation applied to the system 900 shown with arrows 1002, similar to the locality-aware DCT operation illustrated in FIG. 2. In certain embodiments, a locality-aware DCT operation involves the home agent node making optimal data movement decisions by applying the locality information of the request agent node to the home agent node and the locality information of the request agent node to the relevant snoop agent nodes or cache agent nodes, respectively. In certain embodiments, the server host 902 also acts as a home agent node.

In the exemplary locality-aware DCT operation, Generic Initiator 934a sends a memory request to a system address ZM1 that falls within range <C:D>, as shown by arrow 1002a. Using a SAM table, such as Table 2, the system has routing information that indicates the address ZM1 within the memory address range of host memory 910 of the server host 902 in domain Z. The home agent node determines that one or more generic initiators in the system 900 have a cached copy of the data located at address ZM1. Using an IDM table, such as Table 1, the server host 902 determines that the Generic Initiator 932*a* has a cached copy of the data located at address ZM1, that the server host 902 itself is in domain Z, and that Generic Initiator 3 932*a* & Generic Initiator 4 934*a* are both in Domain Y.

With the locality information and the information about location of cached copies of ZM1, server host 902 applies the locality information to form an optimal data movement decision to send a DCT snoop message to Generic Initiator 932*a*, as shown by arrow 1002*b*. The DCT snoop message can either be a forwarding snoop or a delegated snoop. That is, the domain aware data migration scheme comprehends a variety of snoop protocols and policies, and the optimal data movement decision by the home agent is independent of the particular direct cache transfer operation.

After forming an optimal data movement decision, the system 900 executes a direct cache transfer between Generic Initiator 932*a* to Generic Initiator 3 934*a*, as shown by arrow 1002*c*. As a result of the domain aware data migration scheme and its association of hardware-software mechanism of communicating locality information, the system 900 chose the optimal path so that the DCT took place locally within Expansion Box 930. Without the domain aware data migration scheme, server host 902 may have chosen to service the memory request itself because server host 902 would not have the information that Generic Initiator 932*a* having a cached copy, was in the same affinity domain Y as Generic Initiator 934*a*. The resulting data movement without locality information, thus would incur additional latency of going to host memory 910 in affinity domain Z to gather the data located at system address ZM1 and the additional latency and bandwidth overhead of the data transfer taking place from the server host 902 to the Expansion Box 930.

Worse, without the domain aware data migration scheme, if a generic initiator (e.g., Generic Initiator 922*a*, Generic Initiator 924*a*) on Expansion Box 920 had a cached copy of the data located at ZM1, server host 902 may have chosen to send the forwarding snoop to the generic initiator on Expansion Box 920 and data movement would have taken place with all the latency and bandwidth inefficiencies of server host 902 sending the DCT snoop to Expansion Box 920, and the snooped agent Generic Initiator 924*a* on Expansion Box 920 then sending the data right back through the server host 902 on to the request agent in Expansion Box 930.

FIG. 10 also illustrates a locality aware stashing operation applied to system 900 as shown by arrows 1004. In certain embodiments, a locality aware stashing operation involves caching agents in the pathway from the home agent's memory to the stash designation making optimal data movement decisions, applying the locality of the stash destination to the requesting agent or home agent, or the locality of the caching agents in the pathway to the stash designation. In one embodiment, stashing is where the destination can accept the request or reject the request in which case only the IDM is used. Alternatively, an intermediate cache is used in stashing where both the SAM and IDM tables are used. For example, if the node 932 (e.g., a PCIe card) has scarce resources, the stashing operation may use only the IDM table.

In the exemplary locality-aware stashing operation, a Domain Z host CPU 908 is the stash requesting agent, and sends either a stash write request or a stash dataless request, as shown by arrow 1004*a*. In one embodiment, a stash write request involves the data movement originating in the stash requesting agent. In one embodiment, a stash dataless request involves the request not carrying data and the data movement originating in the home agent. In the exemplary operation, the stash request is to an address ZM2 that falls within domain Z, either in range <A:B> or range <C:D>. In the exemplary operation, the stash destination is either Generic Initiator 932*a* or an identifier for Generic Initiator 932*a*'s cache. Routing information in a SAM table, such as Table 2, indicates that the address ZM2 is within the memory address range of host memory 910 in the domain Z, and server host 902 services the stash request by sending a stash snoop request to Generic Initiator 932*a*. Routing information in a IDM table, such as Table 1, across the system 900 route the stash snoop write to Generic Initiator 932*a* via the host interconnect 912, switch 914, switch 936 on Expansion Box 930, and on to Generic Initiator 932*a* on node 4 932.

Once the system 900 routes the stash snoop write to Generic Initiator 932*a*, the stash destination returns a stash snoop miss response, as shown by arrow 1004*b*. In certain embodiments, a miss response occurs because of lack of stash resources at the stash destination or the stash destination choosing to, instead of a stash pull response, react to the stash snoop request with a subsequent read request for address ZM2.

Once the stash destination returns a stash snoop miss response, the domain-aware switch 936 and its remote cache 936*a* are first on the response path to receive the stash snoop miss response, as shown by arrow 1004*b*. Using an IDM table, switch 936 and its remote cache 936*a* determine that Generic Initiator 932*a* is also in Domain Y, and determines that remote cache 936*a* has stash resources for domain Z. The switch 936 and its remote cache 936*a* therefore makes the optimal data movement decision to convert Generic Initiator 932*a*'s stash snoop miss responses to a stash snoop hit/pull response. This results in the stash data moving in affinity to Generic Initiator 932*a* in domain Y regardless of whether the data originated in the Domain Z host CPU 908 or Domain Z host memory 910. When Generic Initiator 932*a* issues a subsequent read request for address ZM2, the data would either already be en-route to switch 936's remote cache, or already be cached in remote cache 936*a*.

Note that the domain aware data migration scheme comprehends all caches within the pathway making optimal data movement decisions. The exemplary data stashing operation describes a scenario where the Domain Y switch cache 936*a* reacts to the stash miss response from a Domain Y target and therefore converts it to a pull response. However, if the Domain Y switch 936 and its cache 936*a* also return a stash miss response, switch 914 and its cache 914*a*, realizing the stash address is a Domain Z address ZM2, makes the optimal data movement decision and converts it to a pull response to server host 902.

Note also that the domain aware data migration scheme comprehends domain-level stashing i.e., the stashing operation itself could use a domain identifier instead of or in addition to the destination identifier. The producer from Domain Z could then choose to move the data to any cache in Domain Y, knowing that the consumer of the data will be a generic initiator in Domain Y. This allows domain-aware stashing capability for both scenarios, the one described here with the consumer Generic Initiator 932*a* not having the resources or the scenario where the producer does not know the generic initiator consumer except that the consumer is located in Domain Y.

As a result of the domain aware data migration scheme and its associated hardware-software mechanism of communicating locality information, the system 900 chose the optimal path such that the system 900 allocated the stashed data in the available cache space located closest to the stash location. With the domain aware data migration scheme, all affinity domain aware caches within the pathway can accommodate a stash miss response. In certain embodiments, the domain aware data migration scheme comprehends an adaptive data movement algorithm whereby a cache close to the stash destination uses the IDM table's same-domain destination identifier to make the decision to cache allocate on a miss response.

FIG. 10 also illustrates a locality-aware local caching operation applied to system 900 as shown by arrows 1008. In certain embodiments, locality aware inline local caching involves making optimal data movement decisions for cache allocation by applying the locality of the requesting agent or home agent.

In the exemplary locality-aware local caching operation, a Domain X Generic Initiator 922a sends a capacity eviction from Generic Initiator 922a's Private Cache (GI2$), as shown by arrow 1008a. The eviction is to an address XM1 that falls within Domain X. Routing information in the SAM table, such as Table 2, indicates that the address XM1 falls within range <D:E> of memory element 924b of node 924. Using the IDM table, such as Table 1, domain-aware switch cache X 926 determines that Generic Initiator 922a is also within Domain X and determines that the switch 926 and its local cache 926b have resources to cache data located at XM1. Because Generic Initiator 922a sent a capacity eviction, Generic Initiator 922a may have insufficient resources to retain data located at XM1. Based on the same-domain properties of the requesting home and caching agent, switch 926 makes the domain-aware data movement decision to allocate data located at XM1 to its local cache 926b.

After allocating the data located at XM1 to local cache 926b, a re-reference by Generic Initiator 922a to XM1 results in a cache miss in Generic Initiator 922a's Private Cache GI2$ and as a result, the memory request for XM1 appears in, and is serviced by, switch 926 out of its local cache 926b, as shown by arrow 1008b. Without domain-aware caching, capacity eviction of XM1 would have been sent all the way to memory element 924b of node 924 and the re-reference by Generic Initiator 922a to XM1 would have incurred the additional latency of having the request forwarded on to node 924 and then serviced by node 924.

After switch 926 services the memory request for XM1, a reference by Generic Initiator 924a to XM1 results in a cache hit in local cache 926b and as a result, the memory request for XM1 appears in, and is serviced by, switch 926 out of its local cache 926b, as shown by arrow 1008c.

After switch 926 services the memory request for XM1, a future capacity eviction of XM1 by an access to XM2 can cause local cache 926b to evict XM1 back to its home agent node 924 because address XM1 falls within range <D:E> of memory element of node 924, as shown by arrow 1008d.

FIG. 10 also illustrates a locality-aware remote caching operation applied to system 900 as shown by arrows 1006. In certain embodiments, locality-aware inline remote caching involves making optimal data movement decisions for cache allocation by applying the locality of the requesting agent or home agent.

In the exemplary remote caching operation, a Domain X Generic Initiator 922a sends a capacity eviction, as shown by arrow 1006a. The eviction is to an address ZM3 that falls within Domain Z. Routing information in the SAM table indicates that the address ZM3 falls within range <A:B> of host memory 910 of server host 902. Using the IDM table, domain-aware switch 926 determines that Generic Initiator 922a is in Domain X but in a domain different from the eviction address and that the switch 926 and its remote cache 926a have resources to cache data located at ZM3. Because Generic Initiator 922a sent a capacity eviction, Generic Initiator 922a may have insufficient resources to retain data located at ZM3. Based on the same domain properties of the requesting and caching agent, switch 926 makes the domain aware data movement decision to allocated ZM3 in its remote cache 926a.

After switch 926 allocates ZM3 to its remote cache 926a, a re-reference by Generic Initiator 922a to ZM3 results in a cache miss in Generic Initiator 922a's Private Cache GI2$ and as a result, the memory request for ZM3 appears in and is serviced by switch 926 out of its remote cache 926a, as shown by arrow 1006b. Without domain-aware caching, capacity eviction of ZM3 would have been sent all the way to host memory 910 or the Domain Z cache 914a and the re-reference by Generic Initiator 922a to ZM3 would have incurred the additional latency of having the request forwarded on to the server host 902.

After switch 926 services the memory request for ZM3, a reference by Generic Initiator 924a to ZM3 results in a cache hit in remote cache X and as a result, the memory request for ZM3 appears in, and is serviced by switch 926 out of its remote cache 926a, as shown by arrow 1006c.

In certain embodiments, the domain aware data migration scheme comprehends that switch 926 can modulate allocation across affinity domains in making optimal data movement decisions. While current methods exist for address range based cache allocation policies, and the illustrated Local Domain X vs. Remote Domain Z or Y allocation can be accomplished with address range based methods, these methods are too fine-grained—a full address decode must be performed and a full lookup may also be required before the decision by Domain X switch cache can be made (e.g., whether to evict XM1 or retain the cache line, whether to allocate eviction ZM3 or let the eviction continue on to the server host 902). Thus, current methods incur additional latency and cost due to the need to store more detailed address information for domain allocation decisions. In certain embodiments, the domain aware data migration scheme allows cache allocation/eviction algorithms based on a coarser grained domain ID lookup, reducing both the latency of making the allocation decisions as well as reducing the stored information to a coarse-grained domain ID without impacting the performance improvements inherent in domain aware cache allocation. FIG. 10 describes a local cache scenario where the switch 926 capacity evicts XM1 because of a decision to allocation a different Domain X address in the switch cache. However, if the switch 926 can dynamically change the capacity of its local vs. remote caching, and there is adequate capacity for caching remote lines, switch 926 could choose to retain XM1 and also allocate XM2. Similarly, the example describes a remote cache scenario where the switch 926 may have to capacity evict ZM3, or not allocate the initial ZM3 eviction, because of lack of Domain Z space in the switch cache. However, if the switch 926 can dynamically change the capacity of its local vs remote caching, and there is adequate capacity for caching local lines, switch 926 could choose to retain or allocated ZM3.

Figure 11A:
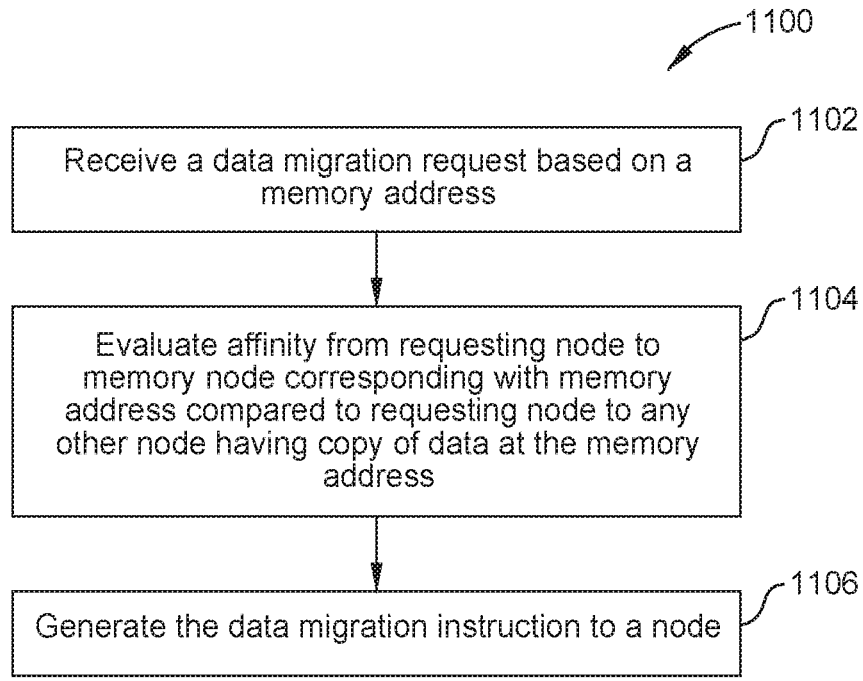
FIGS. 11a and 11b are example flowcharts of example operations for a cache-coherent system according to embodiments disclosed.
Figure 11B:
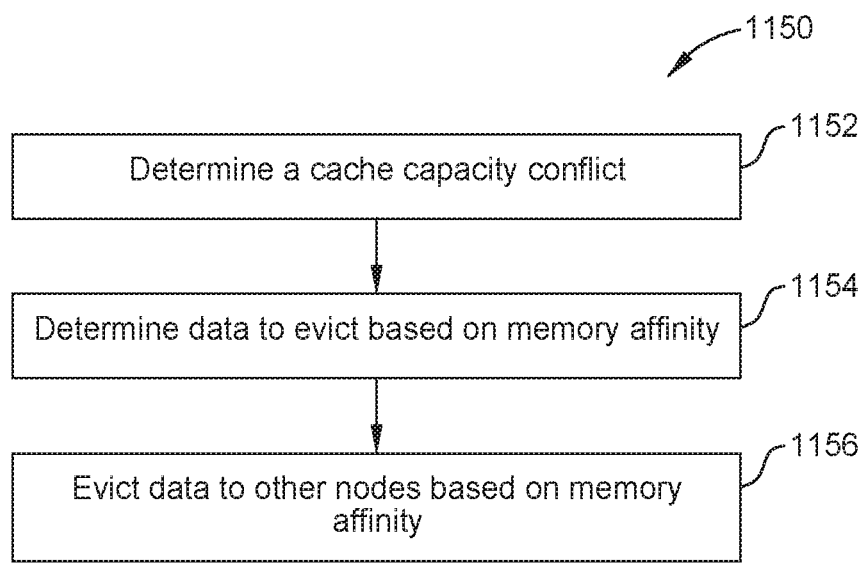

FIGS. 11a and 11b are example flowcharts of example operations for a cache-coherent system, such as the system 100 of FIG. 1 or system 900 of FIG. 9, according to embodiments disclosed. FIG. 11a provides additional description of a locality-aware DCT operation using operations 1100, such as the DCT operations described with reference to FIGS. 2 and 10.

Operations 1100 begin, at step 1102, with the home agent node receiving a data migration request based on a memory address.

At step 1104, operations 1100 continue with the home agent node evaluating the affinity of the requesting node to the memory node corresponding to the memory address compared to the affinity of the requesting node to any other nodes having a copy of the data at the memory address.

At step 1106, operations 1100 continue with the home agent node generating a data migration instruction to a node based on the evaluation in step 1104.

FIG. 11b provides additional description of a locality-aware cache eviction operation using operations 1150, such as the cache allocation operations described with reference to FIG. 10. Operations 1150 begin at 1152 with the caching node determining whether it has a cache capacity conflict.

At step 1154, operations 1150 continues with the caching node determining what data to evict based on memory affinity. For example, the caching node can identify the affinity of the new allocation that caused the cache capacity conflict to its corresponding home node, and then compare that affinity to the affinity of the eviction candidates and their corresponding home nodes.

At step 1156, operations 1150 continue with the caching node evicting the data determined at step 1154 to its corresponding home node.

Figure 12:
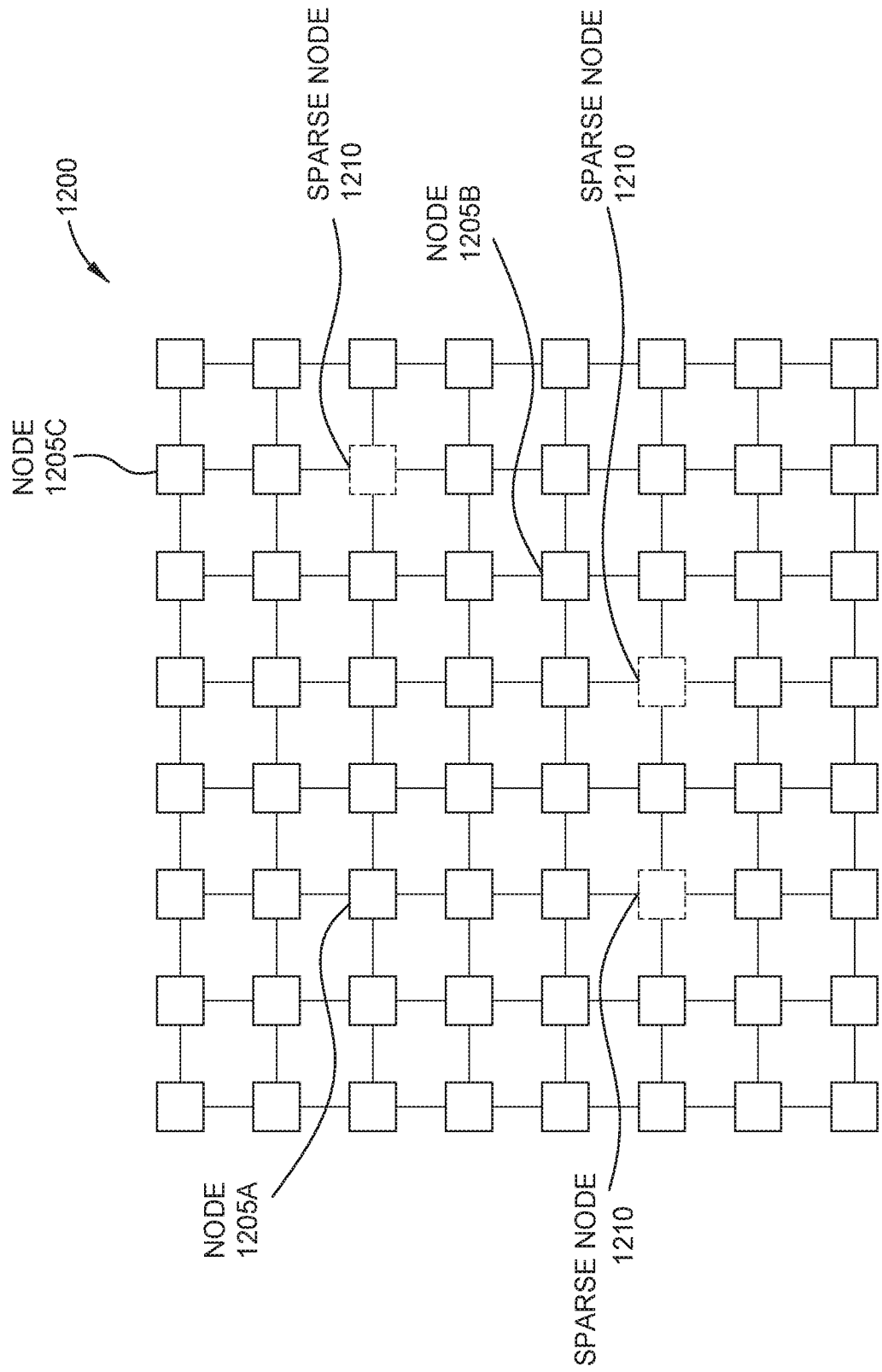
FIG. 12 illustrates is an example graphical representation of a topology of a cache-coherent system, according to embodiments disclosed.

FIG. 12 illustrates is an example graphical representation of a topology of a cache-coherent system, such as system 100 of FIGS. 1-3, which the system determines for the domain aware data migration scheme, according to embodiments disclosed. FIG. 12 illustrates a cache-coherent system 1200 with 64 nodes 1205, and the nodes 1205 can comprise home agent nodes, memory, request agent nodes, or combinations thereof. In certain embodiments, the system 1200 comprises a two-dimensional mesh, so that each node 1205 has a path of communication to other nodes in the system 1200, directly or indirectly. For example, the node 1205A can communicate with nodes 1205B and 1205C using the intermediate nodes.

In one embodiment, as opposed to the relative locality already being calculated and placed in the IDM/SAM tables as discussed above, the relative locality of one node to all other nodes is derived as a function of the position of that node in the grid. The grid in FIG. 12 can comprise a collection of physical or logical nodes with equivalent locality attributes from its single hop neighbors. As an example, assume the node 1205A has a home agent deciding whether to perform a DCT from a request agent in the node 1205B, which has a cached copy, to a request agent in the node 1205C which has requested the data, or to directly deliver a data copy from the home agent in the node 1205A which also has the memory cached to the request agent in the node 1205C. The node 1205A can evaluate the cost of these two options and then decide, based on the absolute location of the nodes in the grid, which is shorter. That is, the node 1205A can use its coordinate location—i.e., (1,5)—in the grid as well as the coordinate location of the node 1205B—i.e., (5,4)—and the node 1205C—i.e., (6, 7)—when making decisions. Using absolute locations in a grid accommodates much larger number of nodes in mesh configurations while offering the same algorithmic benefits for the various locality domain aware data movement decisions as described in FIG. 10.

Moreover, the grid can include sparse nodes 1210 which are nodes that do not have, for example, request agents, home agents, or memory. Nonetheless, data can be routed through the sparse nodes 1210 so that connectivity works similar to if the sparse nodes 1210 did have request agents, home agents, or memory. This topology can be referred to as sparse matrix or dense matrix, depending on the number of sparse nodes.

Figures 13A, 13B:
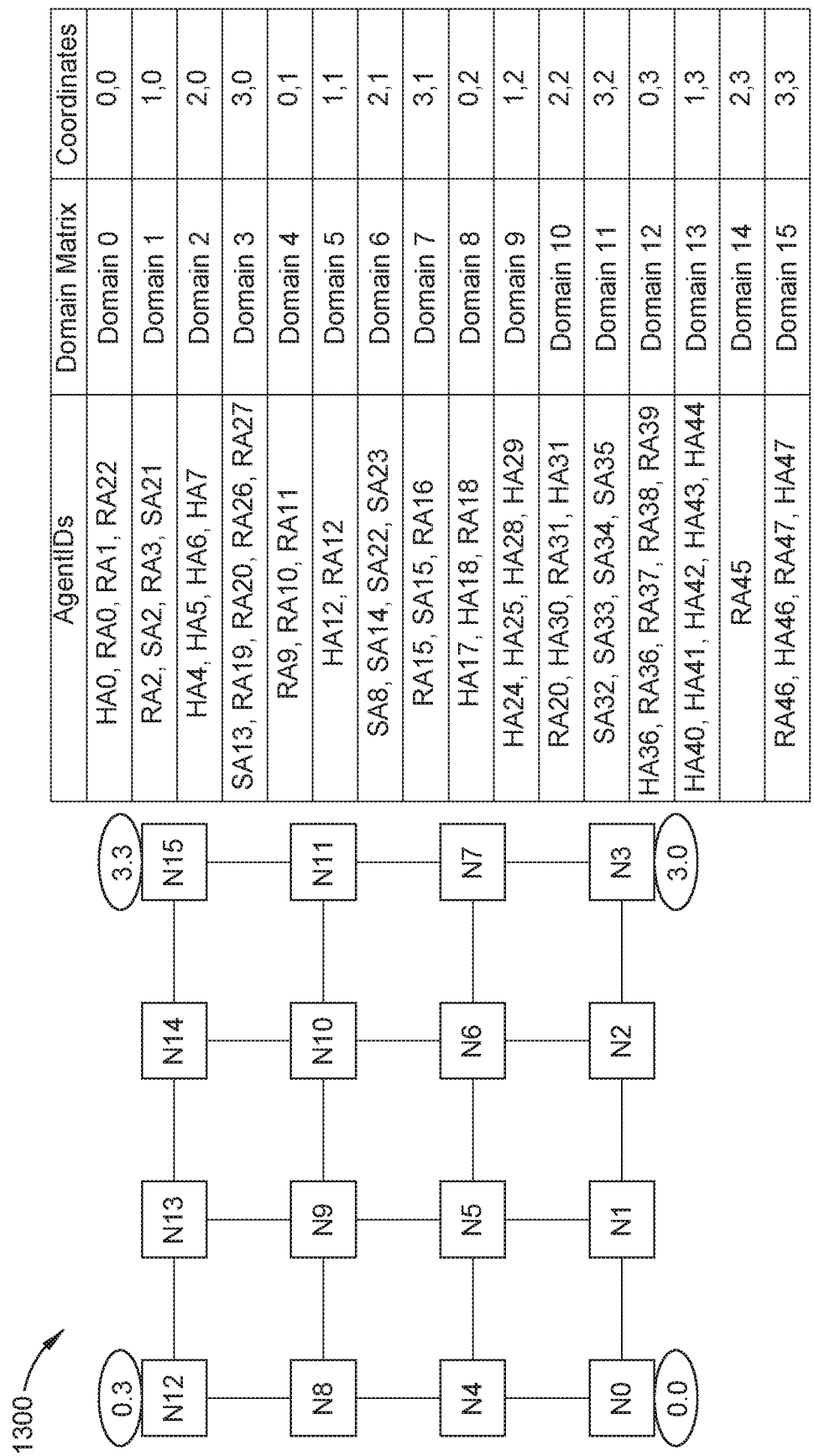
FIG. 13A illustrates a mesh, according to embodiments disclosed.
FIG. 13B is an affinity table, according to embodiments disclosed.

FIG. 13A illustrates a mesh 1300 while FIG. 13B is a IDM table 1305 that include coordinates for nodes for the mesh 1300. The IDM table 1305 is analogous to FIG. 7 and FIG. 8. While FIG. 8 illustrates a domain affinity matrix and FIG. 7 the corresponding node positions to the affinity index of the FIG. 8 domain affinity matrix, the table 1305 illustrates agents and their locality domain identifiers and the grid coordinates of those locality domain identifiers within the mesh in FIG. 13A.

In another embodiment, the tables illustrated in FIGS. 6 and 8 can be modified for an absolute grid-coordinate scheme. In FIGS. 6 and 8, each row represents a particular locality domain with the index position revealing the affinity level of the other indexed domains relative to that particular locality domain. Instead, in this embodiment, the locality domain ID can be indexed into the table and the coordinates of a particular locality domain is programmed in (or extracted from) that data structure by software or hardware. Thus, when using an absolute grid-coordinate scheme, each indexed entry is the absolute coordinate for a particular locality domain rather than being relative locations for a particular locality domain.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method for domain-aware data migration in a cache-coherent system comprising a plurality of nodes, each of the plurality of nodes comprising at least one of a processing element and a memory element, the method comprising:
    determining a multi-dimensional topology of the cache-coherent system;
    generating, at boot-time, an ID map (IDM) table based on the plurality of nodes and the multi-dimensional topology, wherein the IDM table comprises locality information of each of the plurality of nodes relative to the other nodes in the plurality of nodes based on a processing or memory element ID;
    distributing the IDM table to the processing and memory elements of each of the plurality of nodes, wherein the plurality of nodes comprises home agent nodes and request agent nodes; and
    performing data migration operations at a node of the plurality of nodes using the locality information contained in the IDM table.

2. The method of claim 1, further comprising:
    compressing the IDM table by assigning an affinity domain to each of the plurality of nodes.

3. The method of claim 1, further comprising:
    identifying at least one new node added to the cache-coherent system; and
    updating the IDM table distributed to each of plurality of nodes with locality information for the at least one new node.

4. The method of claim 3, further comprising:
    distributing the IDM table updated with the locality information of the at least one new node to the one new node.

5. The method of claim 1, wherein the locality information comprises relative locality levels from one particular node to each node of the plurality of nodes.

6. The method of claim 1, wherein one of the data migration operations by hardware is a data transfer from a first memory element of a first node to a second memory element of a second node.

7. The method of claim 1, wherein one of the data migration operations by hardware is remote cache eviction based on the locality information from a first node, wherein remote cache eviction involves migrating data from the first node to a second node based on cache capacity.

8. The method of claim 1, wherein one of the data migration operations comprises using the IDM table to select a destination node based on differences in affinity between the plurality of nodes.

9. The method of claim 1, further comprising:
generating, at boot-time, a system address map (SAM) table based on the plurality of nodes and the multi-dimensional topology, wherein the SAM table comprises the locality information based on memory address ranges;
distributing the SAM table to the processing and memory elements of each of the plurality of nodes; and
performing data migration operations at a node of the plurality of nodes using the locality information contained in the SAM table, wherein one of the data migration operations comprises generating a cache operation request using the SAM table to determine a distance to a destination node from the node.

10. The method of claim 1, wherein performing data migration operations at the node of the plurality of nodes comprises:
performing a direct cache transfer (DCT) of modified data using only the IDM table.

11. The method of claim 9, wherein performing data migration operations at the node of the plurality of nodes comprises:
performing a DCT using the IDM table and the SAM table.

12. The method of claim 1, wherein performing data migration operations at the node of the plurality of nodes comprises:
performing a stashing operation using only the IDM table.

13. The method of claim 9, wherein performing data migration operations at the node of the plurality of nodes comprises:
performing a stashing operation using the IDM table and the SAM table.

14. The method of claim 1, further comprising:
establishing in a first node of the plurality of nodes a remote cache that tracks local addresses that are cached in computer elements in a different affinity domain than the affinity domain of the first node; and
establishing in the first node a local cache that tracks remote addresses that are cached locally in the affinity domain of the first node.

15. The method of claim 14, wherein the local cache and the remote cache are logical caches in a same cache in the first node, the method comprising:
in response to detecting that one of the local and remote caches is approaching its capacity, reallocating memory addresses assigned to the other cache to the one of the local and remote caches.

16. The method of claim 14, where the local cache is a local memory snoop filter and the remote cache is a remote memory snoop filter.

17. The method of claim 9, wherein the multi-dimensional topology is a grid, and wherein the IDM table comprises locality information of each of the plurality of nodes in the grid with its relative position to the other nodes in the plurality of nodes determined by grid coordinates of the other nodes in the plurality of nodes, and wherein the SAM table comprises the locality information as coordinates in the grid.

18. The method of claim 17, wherein the grid comprises rows and columns, wherein the coordinate in the grid indicates (i) one of the rows and (ii) one of the columns.

19. A cache-coherent system, comprising:
a plurality of nodes arranged in a multi-dimensional topology, each of the plurality of nodes comprising at least one of a processing element and a memory element;
a plurality of switches interconnecting the plurality of nodes; and
an ID map (IDM) table stored in each of the plurality of nodes and the plurality of switches, wherein the IDM table comprises locality information of each node relative to the other nodes in the plurality of nodes based on a processing or memory element ID,
wherein the plurality of nodes are configured to perform data migration operations at a node of the plurality of nodes using the locality information contained in the IDM table.

20. A cache-coherent system, comprising:
a plurality of nodes arranged in a multi-dimensional topology, each of the plurality of nodes comprising at least one of a processing element and a memory element, wherein a first node of the plurality of nodes is a server host and a second node of the plurality of nodes is an expansion box coupled to the server host, wherein the plurality of nodes comprises home agent nodes and request agent nodes; and
an ID map (IDM) table stored in each of the plurality of nodes, wherein the IDM table comprises locality information of each node relative to the other nodes in the plurality of nodes based on a processing or memory element ID,
wherein the plurality of nodes are configured to perform data migration operations at a node of the plurality of nodes using the locality information contained in the of IDM table.

* * * * *

UNITED STATES PATENT AND TRADEMARK OFFICE
CERTIFICATE OF CORRECTION

PATENT NO. : 10,970,217 B1
APPLICATION NO. : 16/422647
DATED : April 6, 2021
INVENTOR(S) : Jaideep Dastidar and Millind Mittal Page 1 of 1

It is certified that error appears in the above-identified patent and that said Letters Patent is hereby corrected as shown below:

In the Claims

Column 24, Line 53, In Claim 20, after "the" delete "of".

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*